April 9, 1963 D. P. SHOULTES ETAL 3,085,230
METHOD AND APPARATUS FOR VERIFYING LOCATION AND RECYCLING
TO CORRECT ERRORS IN MAGNETIC DATA STORAGE DEVICES
Filed Nov. 14, 1958 18 Sheets-Sheet 1

INVENTORS.
DONALD P. SHOULTES
DAVID ROYSE
BY
Francis V. Giolma
ATTORNEY

April 9, 1963 D. P. SHOULTES ETAL 3,085,230

METHOD AND APPARATUS FOR VERIFYING LOCATION AND RECYCLING TO CORRECT ERRORS IN MAGNETIC DATA STORAGE DEVICES

Filed Nov. 14, 1958 18 Sheets-Sheet 2

April 9, 1963 D. P. SHOULTES ETAL 3,085,230

METHOD AND APPARATUS FOR VERIFYING LOCATION AND RECYCLING TO CORRECT ERRORS IN MAGNETIC DATA STORAGE DEVICES

Filed Nov. 14, 1958 18 Sheets-Sheet 7

BI-QUINARY
| Decimal | B0 | B5 | Q0 | Q1 | Q2 | Q3 | Q4 |
|---|---|---|---|---|---|---|---|
| 0 | 1 | 0 | 1 | 0 | 0 | 0 | 0 |
| 1 | 1 | 0 | 0 | 1 | 0 | 0 | 0 |
| 2 | 1 | 0 | 0 | 0 | 1 | 0 | 0 |
| 3 | 1 | 0 | 0 | 0 | 0 | 1 | 0 |
| 4 | 1 | 0 | 0 | 0 | 0 | 0 | 1 |
| 5 | 0 | 1 | 1 | 0 | 0 | 0 | 0 |
| 6 | 0 | 1 | 0 | 1 | 0 | 0 | 0 |
| 7 | 0 | 1 | 0 | 0 | 1 | 0 | 0 |
| 8 | 0 | 1 | 0 | 0 | 0 | 1 | 0 |
| 9 | 0 | 1 | 0 | 0 | 0 | 0 | 1 |
FIG_21
2 OUT OF 5
| Decimal | 0 | 1 | 2 | 3 | 6 |
|---|---|---|---|---|---|
| 0 | 0 | 1 | 1 | 0 | 0 |
| 1 | 1 | 1 | 0 | 0 | 0 |
| 2 | 1 | 0 | 1 | 0 | 0 |
| 3 | 1 | 0 | 0 | 1 | 0 |
| 4 | 0 | 1 | 0 | 1 | 0 |
| 5 | 0 | 0 | 1 | 1 | 0 |
| 6 | 1 | 0 | 0 | 0 | 1 |
| 7 | 0 | 1 | 0 | 0 | 1 |
| 8 | 0 | 0 | 1 | 0 | 1 |
| 9 | 0 | 0 | 0 | 1 | 1 |
FIG_22
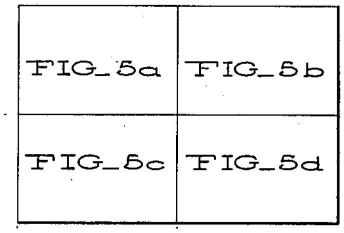
FIG_23
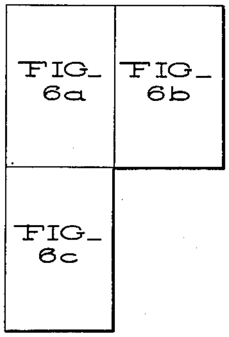
FIG_24

3,085,230

METHOD AND APPARATUS FOR VERIFYING LOCATION AND RECYCLING TO CORRECT ERRORS IN MAGNETIC DATA STORAGE DEVICES

Donald P. Shoultes, Owego, and David Royse, Endicott, N.Y., assignors to International Business Machines Corporation, New York, N.Y., a corporation of New York Filed Nov. 14, 1958, Ser. No. 774,050
10 Claims. (Cl. 340—172.5)

The invention relates to storage devices and more particularly to magnetic data storage devices capable of storing large quantities of data, wherein direct access to each individual record of stored information can be obtained and each individual record can be recorded with a minimum amount of error and lost time.

In computers, data processing machines, or the like, it is quite common to store data in magnetic recording tracks of magnetic drums or in magnetic tapes. The stored data is usually removed in some predetermined sequence for processing, and the desired information is then either returned to a specified storage location or directed to a suitable output device. In most installations, information is recorded sequentially and operated upon in some predetermined manner as it is sequentially read from the drum or tape. However, there are some account installations wherein it is necessary to have available for processing records which do not follow serially in sequence, nor is it economically feasible to store the records in this manner because the desired data or demands will vary widely from operation to operation and day to day.

Under the normal tape installation, it may be necessary to reel and unreel large quantities or lengths of magnetic tape to seek and find one record. This, of course, may cause the computer to stand idle, waiting for the record, and consume a prohibitive amount of processing time.

L. D. Stevens et al. application, Serial No. 477,468, filed December 24, 1954, now Pat. No. 2,924,690, and that of S. H. Blackford, Serial No. 603,551, filed August 13, 1956, now Patent No. 2,919,431, issued December 29, 1959, and assigned to the assignee of the present invention, disclose means for overcoming the above objection by providing random or multiple access to any record in a magnetic disc storage unit or file. This is accomplished by providing a plurality of axially spaced discs which are mounted on a rotatable shaft for rotation in unison. Each disc includes two flat oppositely directed faces or surfaces having magnetic material thereon to provide a plurality of spaced circular data storing tracks or paths. In the Stevens et al. application, the digit positions from track to track are substantially radially aligned to provide substantially identical start, read or write positions at the beginning and end of each group of data on each track, while in the Blackford patent provision is made for ransom writing with the digit positions of each track being advanced by the amount of a gap each time the data is rewritten.

Since each track and disc face is numbered, any track in the storage device may be individually addressed. One or more read/write heads or transducers can be moved to each disc and radially along the faces to any track thereon under the control of an address instruction which has previously been placed in a suitable register or the like. Since a record of a customer, along with all the required information, may be combined into words of data bearing digits and placed in a group on a single track for storage, it can be seen that with the proper instruction any record may be rapidly made available for processing. The major delays are the time required to move the transducer or read/write head to the location desired and the time lost because of errors in locating. With certain accounting operations involving a large number of individual transactions scattered over the entire storage unit and which do not occur in a predetermined serial sequence, this represents a vast reduction in computer idle time.

While the above access memory devices represent a large reduction in access time, positioning errors can still occur, and it is still possible under various conditions during a writing instruction to start a write operation with the head at the wrong track, and erase information therein recorded, which may thereby be lost irretrievably.

The above random access magnetic memory unit combined with a computer makes available an efficient in-line data processing machine. The in-line data method of data processing maintains the records in business continuously up to date. Any transaction affecting a business may be processed when the change occurs, and all records and accounts affected can be up-dated immediately. Thus, information is available at any time with respect to the status of any account at that moment.

A plurality of random access magnetic storage units are provided wherein data are stored in circular tracks or paths on the face of a plurality of constantly rotating discs. Each unit includes 100 disc faces with 100 tracks per face. Thus, 10,000 tracks of storage are provided per unit, or 100,000 tracks would be available in a ten unit system. Each unit has the capacity of storing 6,000,000 digits of data or 600,000 words of ten digits each with sixty words stored as a group on each track. Since from 1 to 10 units are contemplated, 60,000,000 digits or 6,000,000 words of data are available for processing with a time interval which varies from approximately 50 milliseconds up to a maximum of 800 milliseconds after a seek instruction, the average access time being approximately 500 milliseconds. A complete revolution of the discs requires approximately 50 milliseconds. Thus, after the selected read/write transducer reaches the desired track, the operation must normally wait an average of 25 milliseconds before either a read or write operation can be initiated if a fixed digit or starting location on the track is considered.

Under the above circumstances, it can be seen that when processing large quantities of data selected at random locations in the storage units, any reduction in error during manipulation time has considerable value. If a more rapid correction of an error in locating a head at the desired track can be accomplished, the time saved in correcting errors can be made available for further or additional data processing.

The present invention is directed to a method and means for increasing the reliability and decreasing the time required for correcting errors in locating an arm for recording or writing in a random access data storage device by actually checking the address of the track when a specified access arm and read/write head is placed at the selected track. The address of each track is initially placed at the beginning of each track, and as soon as the selected transducer is properly located at the desired track, a check operation can be immediately initiated to compare the address of the track with a stored value of the address desired, which is used to locate the transducer.

If the check of the address shows the transducer to be at an incorrect location, no recording operation is performed. Instead, an error signal causes the transducer to move to an artificial address removed a predetermined number of discs away, after which a recycling operation occurs and the transducer is again moved to the desired address, this recycling being repeated until the correct address is found or the operator acts to correct the situation. The recording operation is initiated only after a correct comparison of the addresses, followed by an erase phase in which any data passing under the transducer is erased or removed. After a predetermined length of the track has been erased, corresponding to a predetermined number of words or digits, a gap or space end signal is generated, after which the track address is rewritten, whereupon the data, arranged as a group of words, is delivered from a buffer storage device and recorded on the track serial by bit, digit and word. As the latter portion of the word group is delivered, this data overlaps and is recorded in the initial portion of the previously erased section on the track. The last bit written in the word group indicates the end of that particular record, and it is physically located along the circumference of the track at a suitable distance from the initially recorded end of gap signal on the same track. This provides a signal-free gap between the last digit and first recorded digit which is approximately two words in length, depending upon various operating conditions. This interval is sufficient to permit the read amplifiers and other circuitry to settle and be in condition to initiate a read operation upon the arrival of the previously generated end of gap pulse at the read/write heads.

From the above, it can be seen that recording on any track may be accomplished at random after the selected transducer is properly positioned, without waiting for a synchronization signal or the like which is timed to appear at some specific point in the disc revolution, but not before it has been ascertained that the track selected is in fact the desired one. Also, when a plurality of heads are utilized, they may be circumferentially positioned at any suitable location.

The above random recording and checking operation results in a greatly reduced number of errors and loss of stored information because of recording at the wrong track, which results in loss of the information previously stored therein.

The recording of data occurs at random for each recording and varies from track to track, disc face to disc face and unit to unit without regard to any particular synchronization or home pulse location, and occurs only after it has been verified that the track selected is the correct one.

The reading of data from any track must await the generated end of gap signal and verification of the address provided on the selected track, a recycling operation being automatically initiated to reseek the correct track each time an error in location occurs.

It is one of the objects of the invention to provide a high capacity storage device with an improved address verification recycling operation which provides an average reduction in the time required for correction of an error in track location.

It is another object of the invention to provide a data storage device with an improved recording recycling operation cycle which provides for eliminating many errors caused by disc runout, worn magnetic film, weak recorded data signal, dirt on the track, etc.

It is yet another object of the invention to provide a random access storage device having a record storing circular track which stores a track address along with data record written at random along the track, and uses this address for automatically recycling the read/write head to reseek the correct location in the event it is positioned at the wrong address or a comparison of addresses indicates a wrong address.

It is another object of the invention to provide a multi-tracked random access magnetic storage device for storing a word group in a track which permits recycling of a recording head to find the correct track in the event the head is directed to the wrong track.

It is yet another object of the invention to provide a random magnetic storage device having data storing tracks each with a recorded address and a plurality of access arms which may be concurrently directed to different tracks for consecutive reading or writing operations, for comparing the address of each track to which any one of the arms is directed with a stored value of the desired address before commencing a reading or recording, and recycling the arm automatically in the event of a compare error, to find the correct track.

It is yet another object of the invention to provide a random access magnetic disc type data storage device which first checks the track address recorded on the track, recycles in the event of an error, then erases a portion of the track and rewrites the address prior to the delivery of the data to be recorded.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a block diagram of a data processing system incorporating a small capacity intermediate buffer storage device and a plurality of large capacity random access magnetic storage units to which the improved location verifier and recycling recording operation is applicable.

FIGS. 2*a* and 2*b*, with 2*a* disposed above 2*b*, diagrammatically represent the calculator distributor along with circuitry for receiving and transferring the distributor information into current conducting circuits for selectively operating access arms of random access units and for selecting a particular read/write head to be used in the read or write operation.

FIGS. 5*a* to 5*d* schematically represent in block diagrams a method of reading and writing a record on a selected track of a random access memory unit.

Figure 3:
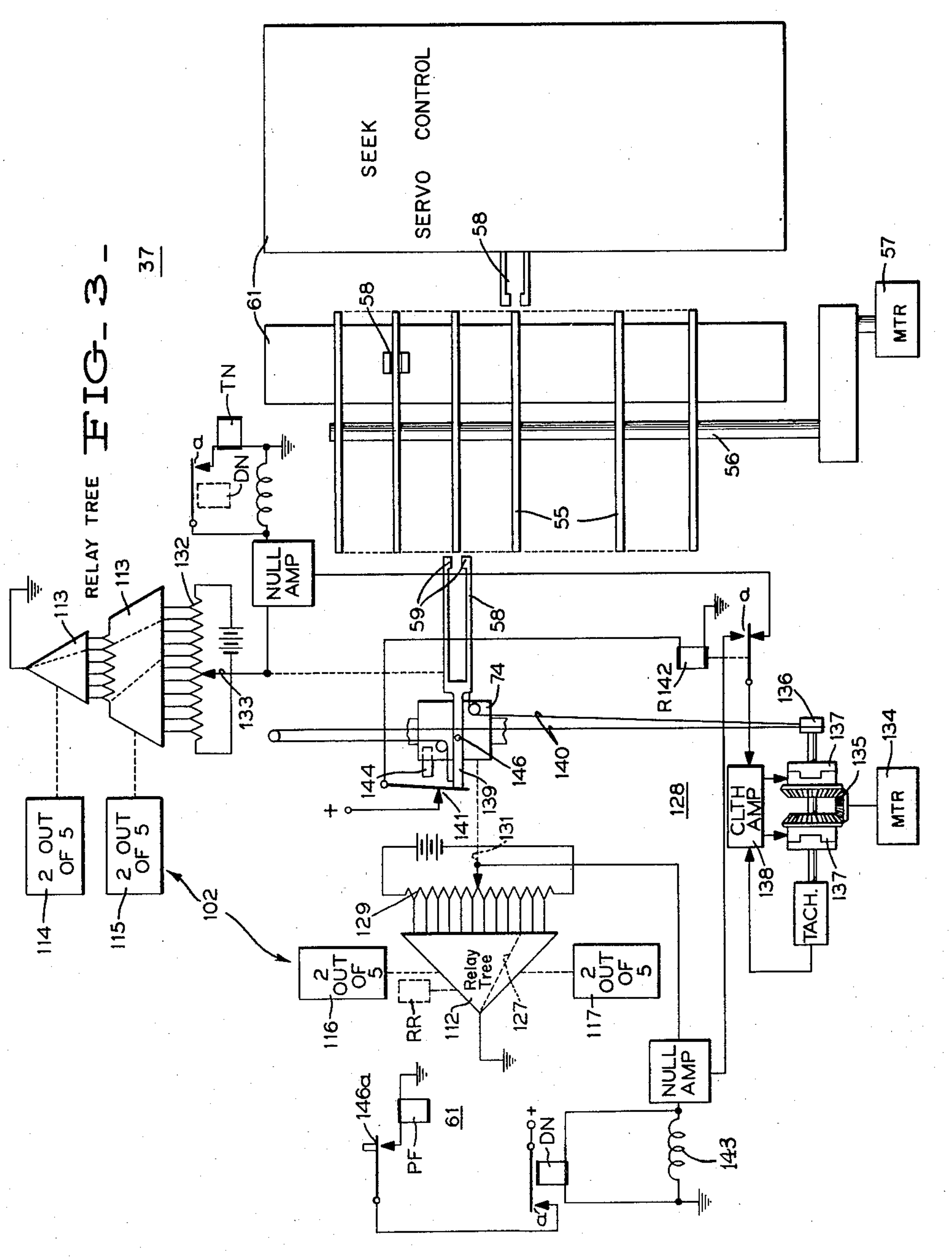
FIG. 3 is a diagrammatic view of a servomechanism for selectively positioning a related access arm at the desired disc and track location in accordance with the instruction in the register.
Figure 6A:
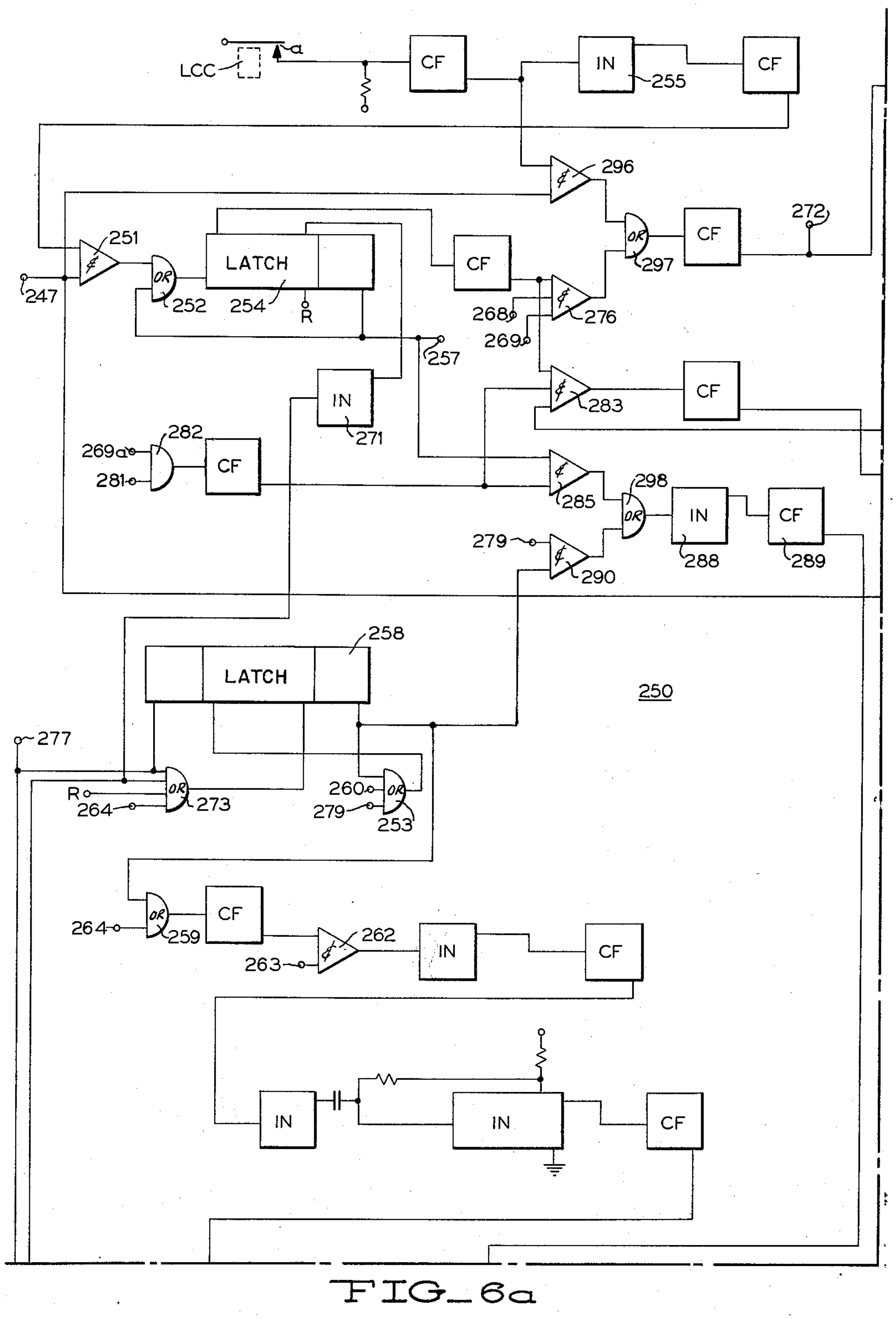
Figure 6B:
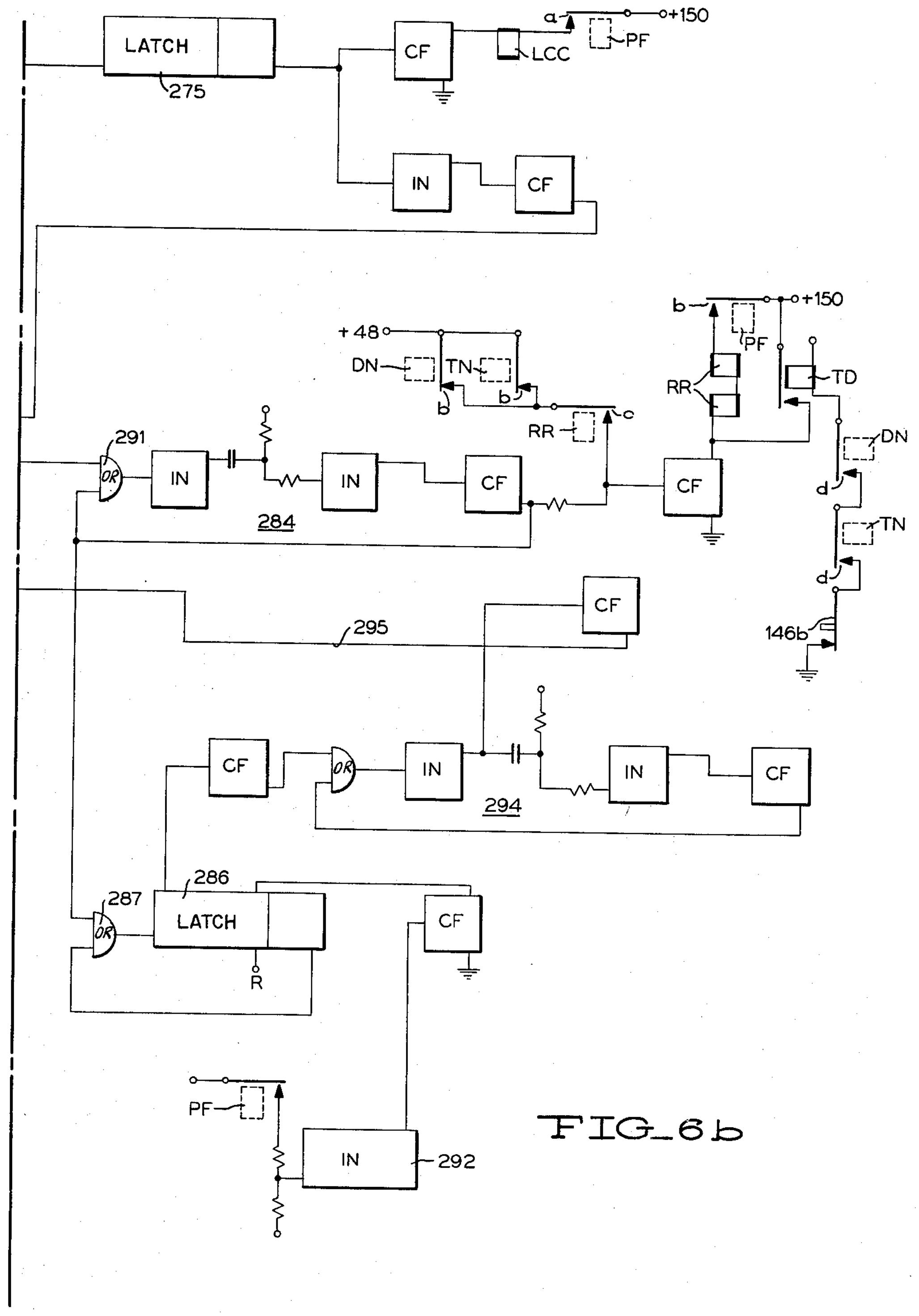
Figure 6C:
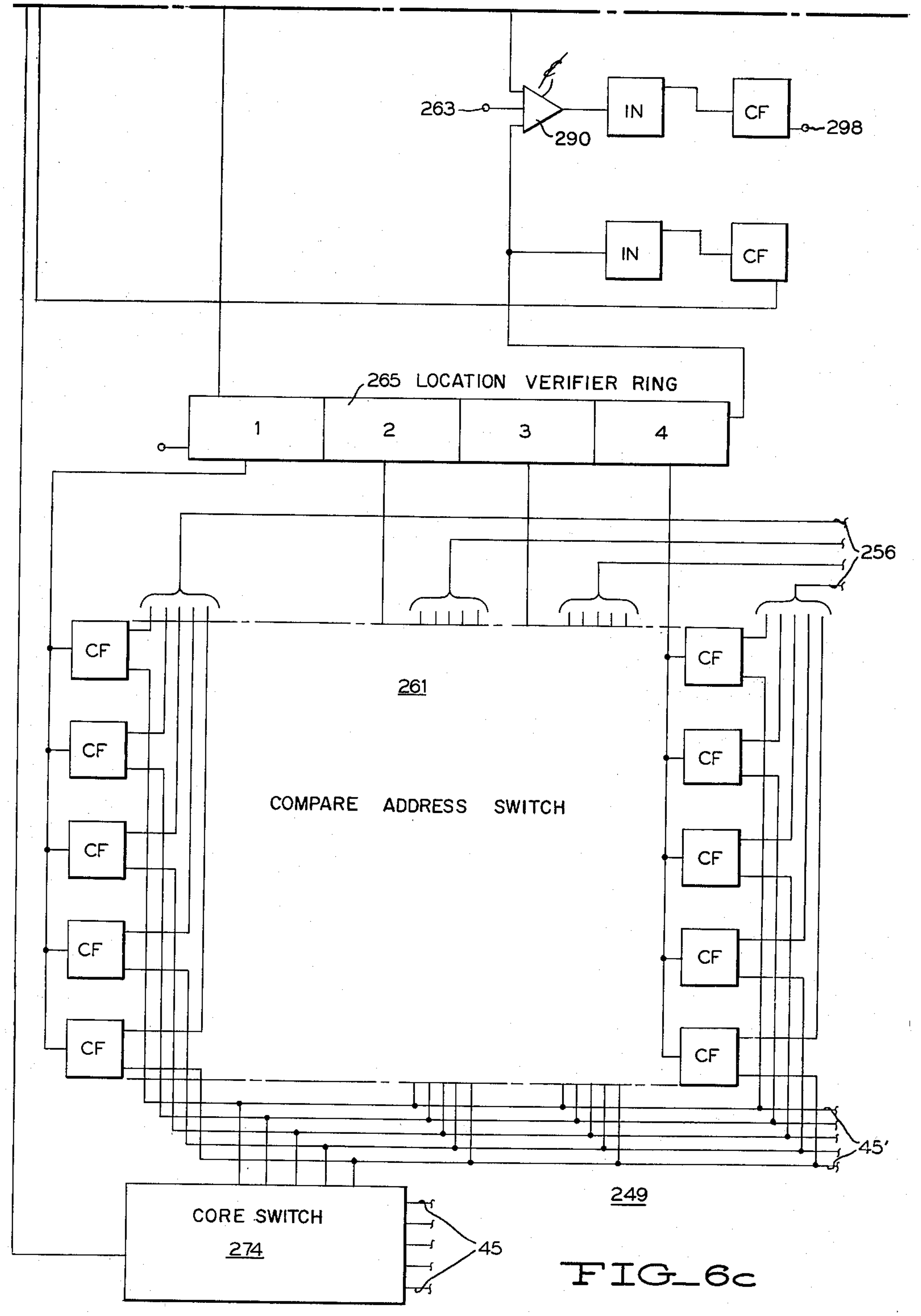

FIGS. 6*a* to 6*c* schematically represent in block diagrams apparatus for verifying a track address and operating the servomechanism of FIG. 3.

Figure 7:
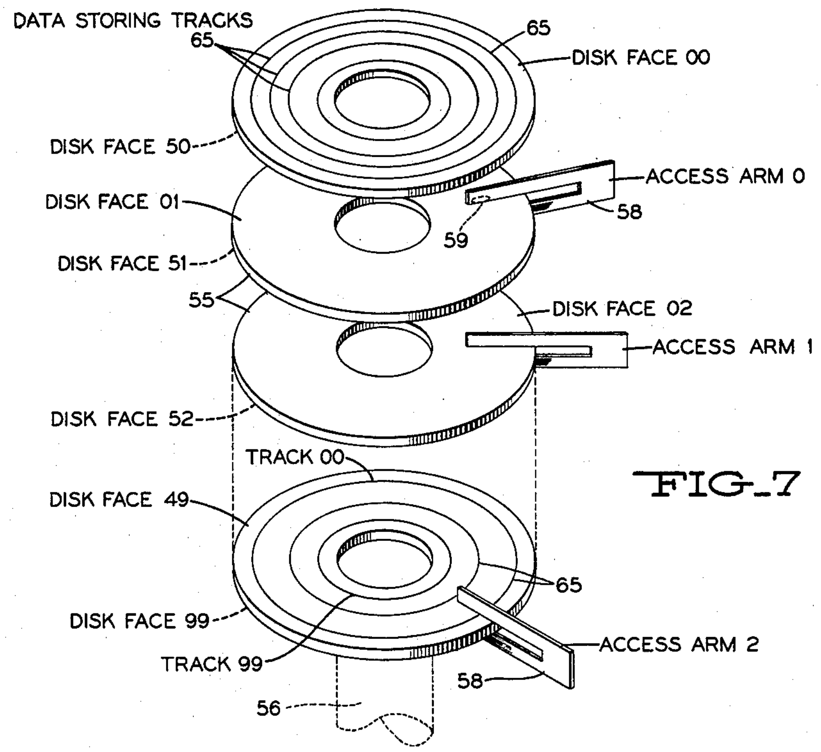

FIG. 7 is a diagrammatic isometric view of a plurality of discs forming part of a random access data storage file unit.

Figure 8:
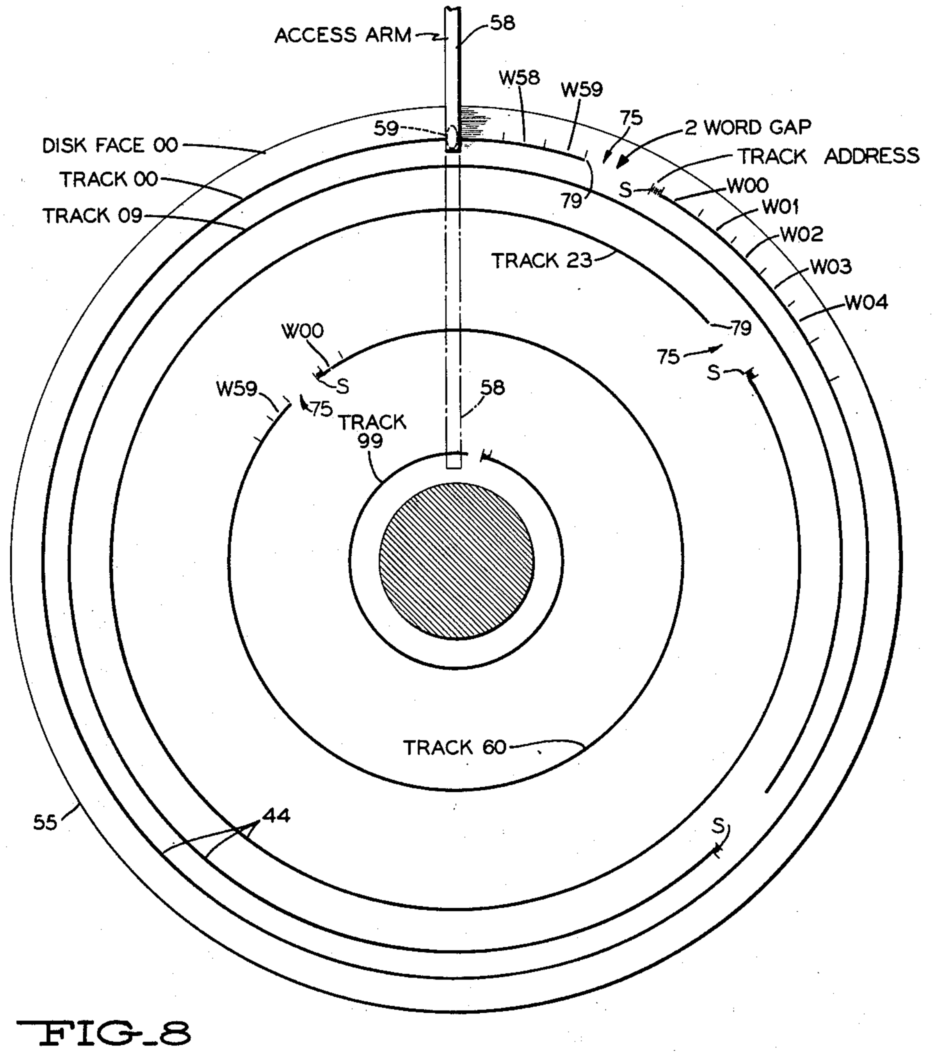

FIG. 8 is a top plan view of one of the discs diagrammatically showing some of the circular data storing tracks or paths.

Figure 1:
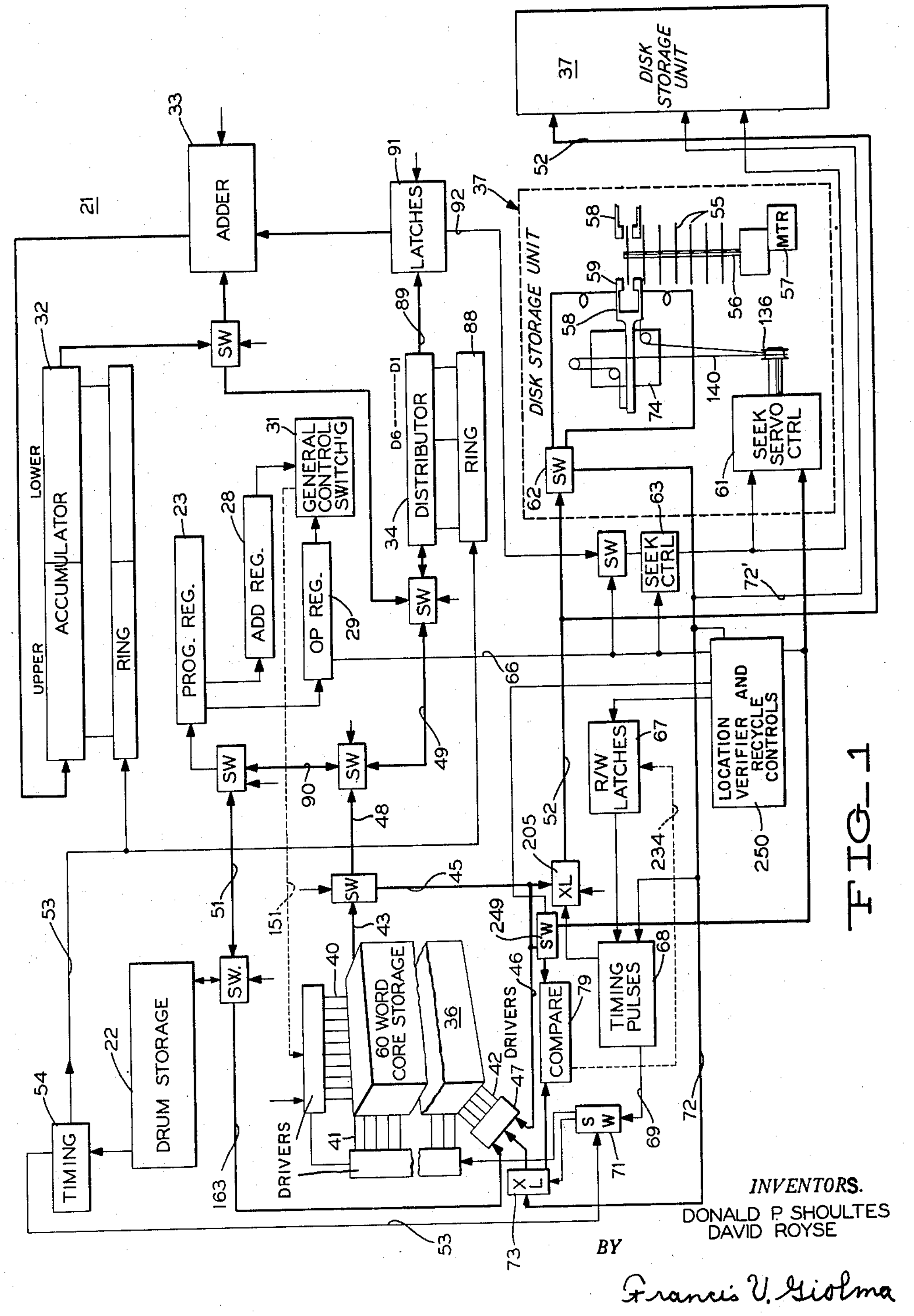
Figure 9:
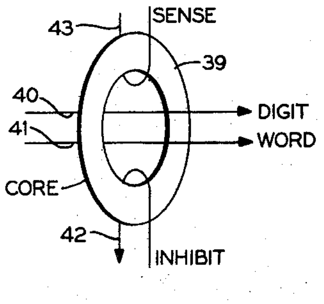

FIG. 9 is a diagrammatic showing of one bit position of a core storage device which is incorporated in the immediate or buffer storage unit shown in FIGS. 1 and 5.

Figure 10:
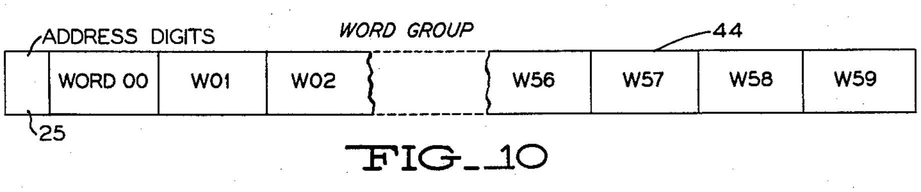

FIG. 10 is a block diagram of a track address and a group of 60 words which represent the data stored on a single track.

Figure 11:
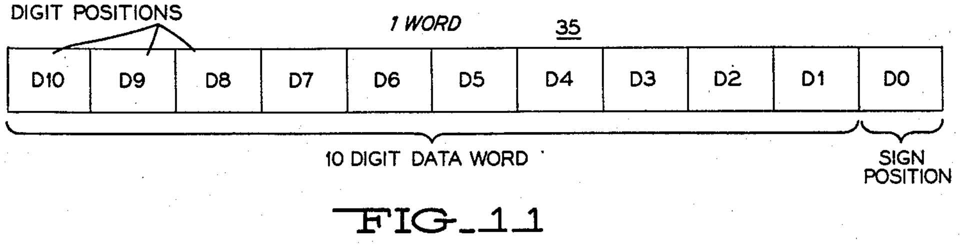

FIG. 11 is a block diagram of a single ten digit word of data plus sign.

Figure 12:
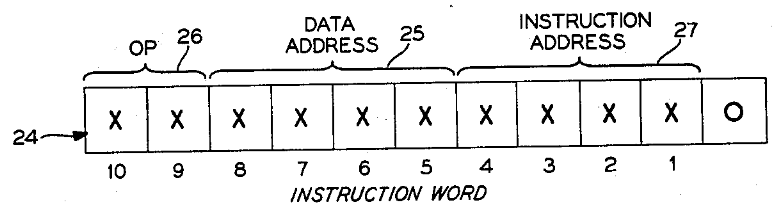

FIG. 12 is a block diagram of a ten digit instruction word used in the processing of the data words.

Figure 13:
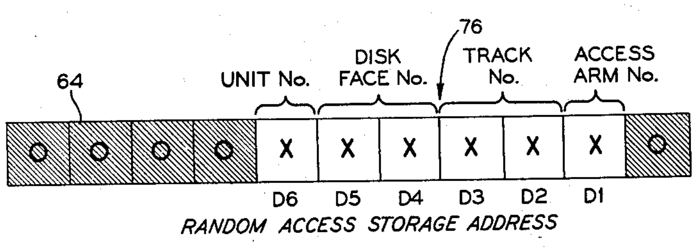

FIG. 13 is a block diagram representation of an instruction word for a random access storage address.

Figure 14:
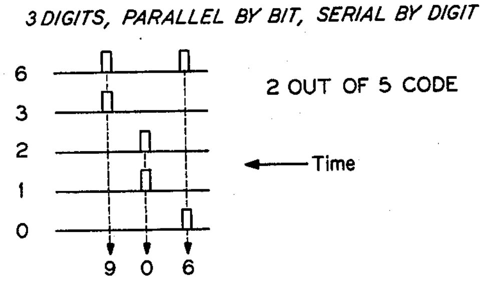
Figure 15:
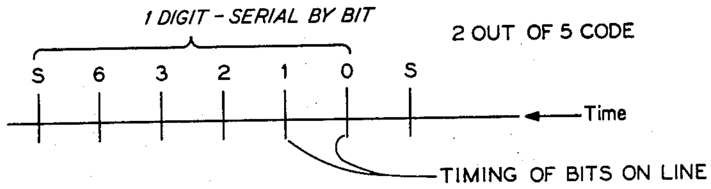

FIGS. 14 and 15 show the bit lines for transferring data, parallel by bit and serial by bit, respectively.

Figure 16:
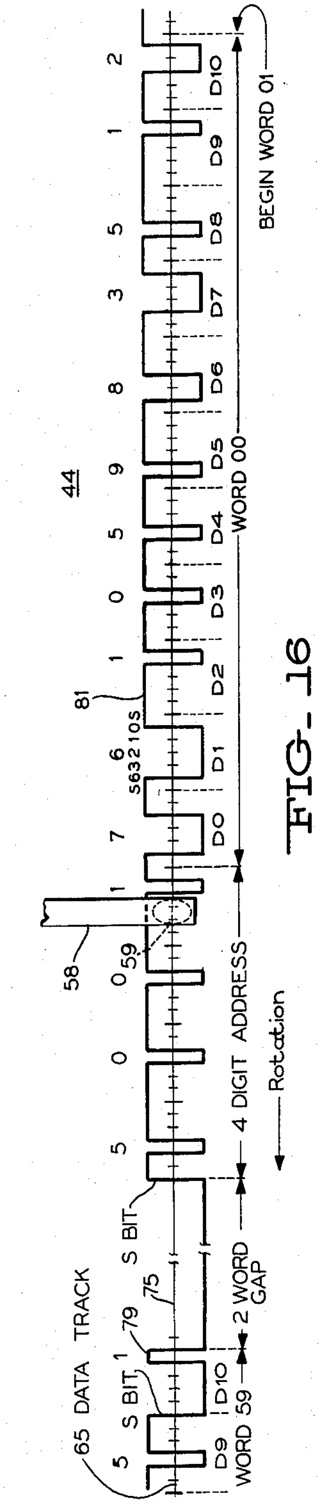

FIG. 16 is a developed view of a flux pattern representing data stored along one of the tracks.

Figure 17:
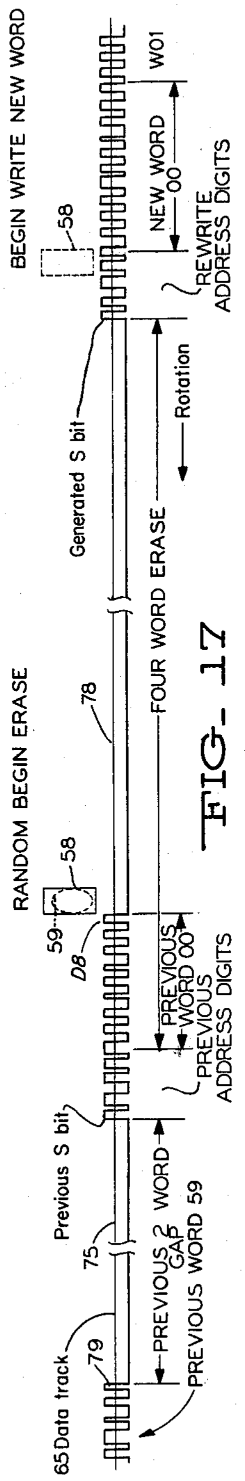

FIG. 17 is a developed view of the beginning of a recording operation along one of the tracks.

Figure 18:
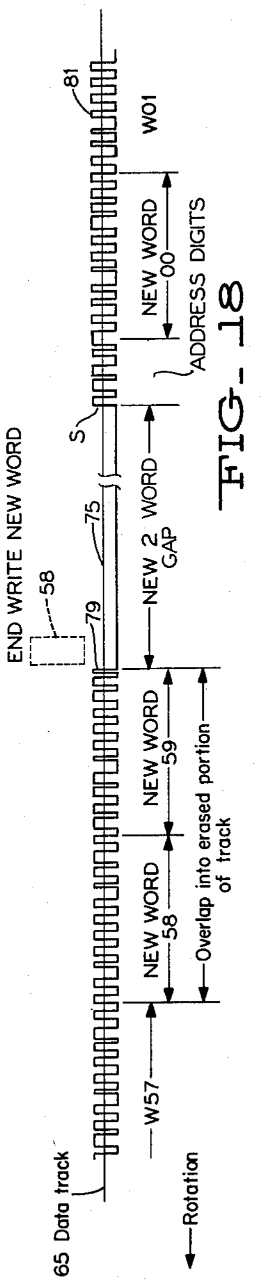

FIG. 18 is similar to FIG. 17 but shows the end of the recording operation along the same track.

Figure 19:
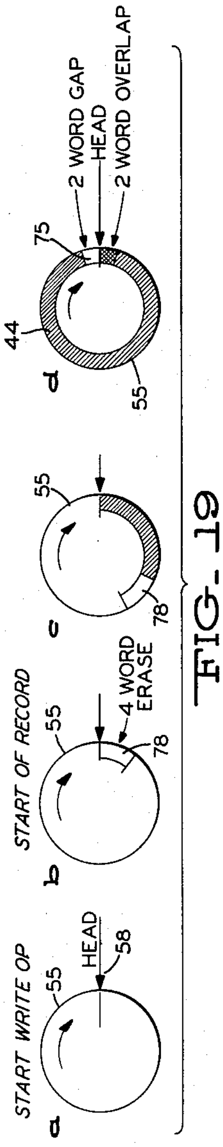

FIG. 19 is a diagrammatic development of a recording operation.

Figure 20:
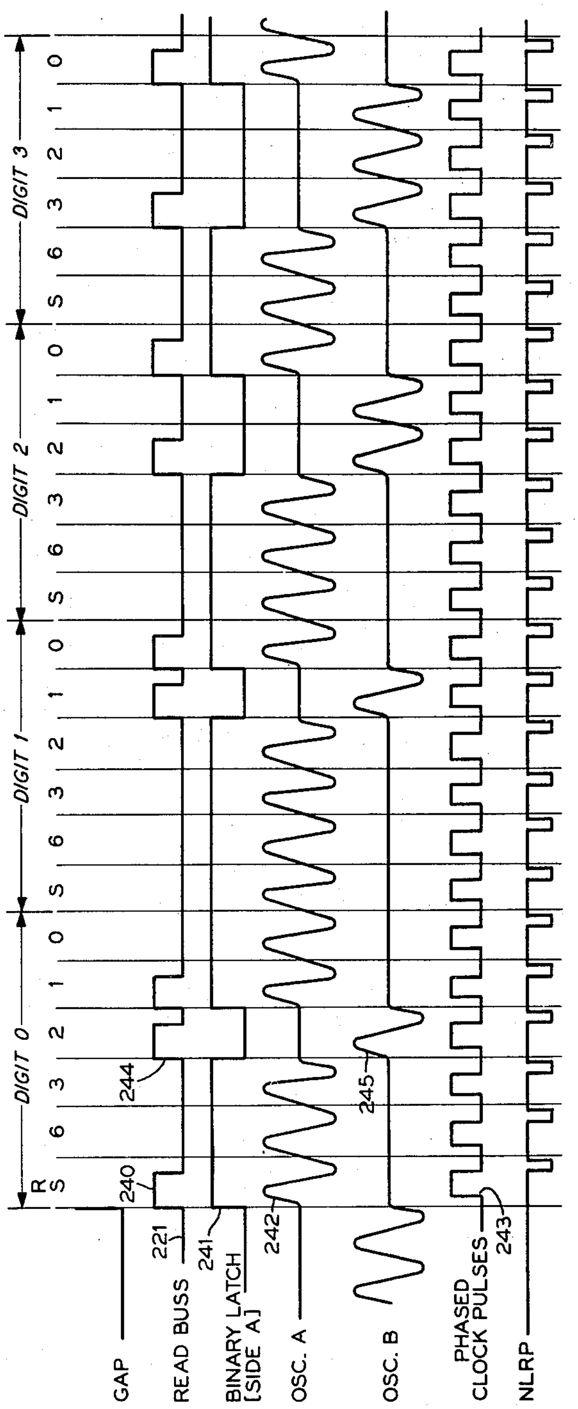

FIG. 20 is a timing diagram of the serial reading of data from a data track along with certain of the required timing pulses for the reading and writing operation.

FIGS. 21 and 22 show how the ten decimal digits are represented in biquinary and 2-out-of-5 codes.

FIG. 23 shows the sheet layout of FIGS. *5a* to *5d*, inclusive.

FIG. 24 shows the sheet layout of FIGS. *6a* to *6c*.

*Tubes and Control Switches*

In each of the drawings of the various control devices, the individual components or units making up that device are indicated merely as a box or block. The specific circuitry of such blocks will not be generally described as applied to various typical forms of tubes and diode circuits. A detailed description of necessary typical diode coincident switches, diode mixers, inverters, single and double latches, along with cathode followers and power tubes, where required, and which would be applicable or necessary to apparatus of this type is shown and described in F. E. Hamilton et al. application, Serial No. 544,520, filed November 2, 1955, now Pat. No. 2,959,351, issued November 8, 1960, and assigned to the assignee of the present invention. In fact, the disclosed embodiment is applicable to the data processing unit disclosed in the Hamilton et al. application.

For the purpose of this description, a typical coincident switch, shown as a triangle, otherwise known as a logical AND circuit or diode switch, comprises diodes or the like, not shown, each including an individual input terminal normally biased negative so that the common terminal is at a negative potential with respect to ground. If coincident positive pulses are applied to all input terminals, the potential of the output terminal is raised. However, if only one of the input terminals is pulsed positively, the potential of the common output terminal is not raised appreciably. Any voltage responsive device may be controlled by the potential of the output terminal to furnish a usable output voltage level whenever a coincidence of positive input pulses is detected.

A typical mixer, otherwise known as a logical OR circuit or diode mix, may also comprise diodes or the like. In the present drawings to distinguish diode mixers from diode switches, the former is shown as an arc of a circle. Any suitable voltage responsive device is controlled by the potential of the common output terminal of the diode mix. This terminal is connected by a suitable resistor to a negative voltage source, not shown, and maintains a negative bias in the related grid of the tubes. Each diode is connected to an individual input terminal which in turn is connected in the electrical circuit. If either one or all of the diode input terminals is pulsed positively, the potential of the output terminal is raised, which permits the tube associated therewith to conduct or operate in a predetermined manner.

Hereinafter in the specification wherein a conductor or circuit terminal or the like is referred to as being positive or negative in potential, this does not necessarily mean that the point in question is positive or negative in an absolute sense, but more positive or more negative relative to its previous state. This principle also applies to any description wherein positive or negative pulses are mentioned or referred to as up or down, or raised or lowered.

While cathode followers, inverters or the like are not always shown in detail, it is to be understood that various types may be utilized in different locations and the circuits may involve various resistance values and capacity couplings to produce the desired outputs. Since the particular cathode followers and inverters used are not part of the invention, a detailed description of each possible type is not deemed necessary. Likewise, in the drawings, all power tubes, inverters, double inverters, and the like which would normally be required to maintain the proper signal level have, for the purposes of simplicity, been either shown only in block form or eliminated. The type and number and particular location would depend upon the results desired. Also, for the sake of simplicity, details of the necessary driving rings, single and double latches have been eliminated. Generally, a single latch comprises a double inverter and cathode follower which responds to an input signal to raise the output of the cathode follower, which in turn supplies the desired signal and has a feedback leading to the input to maintain the cathode follower conducting. The latch is turned Off by interrupting the latch back signal. A more detailed explanation is provided in the above Hamilton et al. patent, and apparatus of this type is shown and claimed in E. S. Hughes, Jr., Patent 2,628,309, issued February 10, 1953.

In FIGS. 1, *2a–2b*, and *5a–5d*, a series of single connecting lines are shown leading to and from the various blocks. It is to be understood that the major portion of these single lines actually embody a plurality of lines and that single lines are shown as a means for simplifying the drawings. The heavy shaded lines represent the data transmission lines between the blocks, while the lighter shaded lines are primarily control lines for selectively directing the data from one location to another.

*General Description*

Referring to FIG. 1, there is shown generally a system of the type disclosed in the Blackford patent hereinbefore referred to, comprising a data processing machine or calculator 21 which is provided with a magnetic drum or the like 22 for storing a quantity of data as magnetized spots on the surface. A program storage device or register 23 is provided for storing a single program step or word 24.

The program or instruction word 24, FIG. 12, comprises 10 digits which are divided into three portions: a four-digit address portion 25, D8–D5, for instructing the machine where data to be processed is located in the storage 22; a two-digit operation portion 26, D10–D9, for instructing the machine what operation or process the machine is to perform with the data found in the address portion; and a four-digit instruction portion 27, D4–D1, for instructing the machine where the next program step is located in storage.

An address register 28, FIG. 1, and an operation register 29 are provided for receiving the address portion 25 and the operation portion 26, respectively, from the program (register) 23. Switching circuitry is provided under the control of the address register for selecting any storage position on the drum 22 or other available storage device on the machine in accordance with the value stored in the address register 28. Switching circuitry 31 is also provided under control of the operation register 29 for determining the operation the machine is to perform on the data found at a selected address position. After an address is selected and the data found at the address is operated upon by the machine, the instruction portion 27 of the program word is entered into the address register 28 from program storage 23 to replace the value previously in the register. A new program step located at the address in storage corresponding to the instruction portion 27 of the program step in the address register is selected and transferred into the program storage device 23 to replace the value previously stored therein. Thus, large numbers of program values and considerable amounts of data may be stored on the magnetic drum 22 and the sequence of the above-outlined procedure may automatically continue for a large number of program steps.

An accumulator 32, an adder 33, and a distributor 34 are also provided in the machine as well as circuitry for introducing machine developed values to be added. The machine is provided to handle a plurality of digits grouped to define a word of data. As shown in FIG. 11, the word of data or operand 35 consists of 10 digits and an algebraic sign. The words are stored serially on the drum and the digits of a word are stored serially within each word interval. Digits are represented by parallel combinations of magnetically stored bits, as shown in FIG. 14. Information is thus said to be stored parallel by bit, serial by digit and word. While various coding systems may be devised, in this particular embodiment, the arithmetic units use a biquinary system, as shown in FIG. 21, where the presence of two of seven possible parallel stored bits determines the digits decimal value.

In the stored programming system used by this machine, each instruction (program step) is stored in a word storage location as a ten digit word, FIG. 12. The coded digits of an instruction word, when interpreted by the program control circuits give information as to what operation is to be performed, in which storage location to find the data to be used in performing the operation and in which storage location the next ten digit instruction word is to be found. A stored sequence of such instruction words forms a program routine.

Calculations are performed by electronic means. All arithmetical and logical operations are built into the machine. They are activated by the operation code portion 26 of the instruction word 24. The arithmetic units of the machine are designed to handle numbers in a serial fashion. Thus, during calculations, the 10 digit data words 35 are processed by the arithmetic units on a digit by digit basis with machine time progressions through the units digit to the highest digit word. The basic cyclical timings of the machine are therefore related to digit position rather than digit value. In the arithmetic portion of the machine, the value of a digit is determined by simultaneous combinations of bit pulses on two of the seven parallel information lines.

Included with the above calculator is a ferrite core, immediate access or buffer storage device 36, FIGS. 1 and *5b*, and one or more random access magnetic disc data storage files or units 37, FIGS. 1, 3 and *5d*. The core or buffer storage device 36 is connected to selectively deliver or receive data from the drum storage 22, distributor 34 and the random access units 37. In addition, it is capable of directing stored data directly to the calculator under the control of the operation and address registers 29 and 28, respectively.

The particular type of core storage device 36 forms part of the present invention. However, in this instance, nondestructive type readout is provided with readin immediately following readout within the same digit time to return the digit of data to its original position. In FIG. 9, a single bit core storage position 39 is diagrammatically shown with the appropriate digit, word, inhibit and sense lines 40, 41, 42, and 43, respectively, threaded therethrough.

In operation, assuming the core is set storing a bit, when current simultaneously flows through the digit and word lines during readout, the combined flux is sufficient to flip the magnetic setting or magnetism of the core 39. As the magnetism reverses, the flux generated is detected by the sense line 43 which directs this change to suitable utilization equipment. After readout, the current in the digit and word lines is reversed during the same digit time to again reverse the magnetism of the core and return the bit value to the core; should it be desired to prevent a readout or change in the state of the core, the inhibit line 42 is energized simultaneously with the digit and word lines 40 and 41, respectively, to produce a flux opposing the combined digit and word flux, which is sufficiently great to prevent the core from changing its state and influencing the sense line 43.

There are five 1 bit cores arranged in parallel for each digit position to represent a 2-out-of-5 bit code shown more clearly in FIG. 22. In the example given, a sixty word core array is provided and represents a word group 44, as shown in FIG. 10. This group comprises sixty 10 digit words plus a sign for each which totals 660 digit positions to store the desired data. Each digit position is consecutively sampled from digit 0, word 00, through digit 10, word 59, and readout occurs over the sense lines 43, FIG. 1, parallel by bit, serial by digit and word.

A more complete description of the operation of a core store unit of this type appears in R. C. Greenhalgh application, Serial No. 554,583, filed December 21, 1955, now Patent No. 2,872,666, issued February 3, 1959. Readout from the core storage is directed over the lines 45 and 46 to the core input or bit drivers 47 associated with the inhibit lines 42 for regeneration. In addition, the data may be selectively directed over the lines 48 and 49 to the distributor 34 to drum storage 22 over the lines 48, 90, and 51, respectively, or over the lines 45 and 52 to the random access storage units 37.

In order to transfer data from the drum 22, the proper operation code must be presented at the operation register 29. At the proper time, the data is delivered over the appropriate data lines in synchronism with the timing pulses appearing on lines 53 leading from a timing unit 54, which is operated under control of the drum 22. With data resting in the core or buffer storage 36, the drum timing 54 is disabled or disconnected from the core drivers. Whenever data is to be removed from the core storage for processing in the calculator or for storage on the drum, the drum operated timing unit 54 is utilized to drive or move the data at the desired rate. This data is directed over the lines 49 or 90, as the case may be. During the interval when the core storage is not called upon to receive or handle data, the drivers are disconnected or uncoupled from the drum timing unit. The drum timing unit 54 performs no data transfer function to the random access disc storage units 37.

As previously mentioned, the random access disc storage units 37 are provided to make available large quantities of data for processing with a minimum loss in time. As shown in FIGS. 1 and 3, each unit includes a plurality of discs 55 mounted on a single shaft 56 for rotation in unison. Rotation of the discs is provided by a suitable substantially constant speed drive means or motor 57. In order to selectively read or write data on one of the faces of one of the discs, a plurality of adjustable bifurcated access arms 58 are provided. Each access arm includes a pair of inwardly facing transducers or read/write magnets 59, carried or mounted on the outer extremities of the bifurcated arms to embrace a single disc at a time. An electromechanical servocontrol mechanism, generally indicated at 61, is provided for each access arm 58 to radially shift the same to clear the outer periphery of the discs 55 and to vertically translate the related arm to any one of the plurality of discs. The transducers carried by the access arm are connected or coupled through suitable switching 62 to either receive data from the core storage array 36 or to deliver data thereto in accordance with an operation instruction to be hereinafter fully described.

As shown in FIG. 1, a seek control mechanism 63 is connected through suitable switching to the distributor 34 of the calculator. Before a read or write instruction to the random access storage unit can be completed, a seek instruction word 64, FIG. 13, must be loaded into the distributor 34. After loading the distributor with the seek instruction, the operation register 29 directs the output of the distributor to the seek control circuitry 63 to initiate operation of the selected access arm 58 to one of a plurality of data storing tracks 65, FIG. 7.

Assuming the desired access arm is properly located, with a write instruction, the operation register signals are directed over a line 66, FIG. 1, through location verifier and recycle controls 250 for checking the location of arm 58, and then to suitable read/write control latches 67. These latches initiate operation of timing pulse generating means 68 to direct a series or group of timing pulses over a line 69 and gating switches 71 leading to the core array 36 to drive the data from the core storage for writing on the selected track. A read instruction in the operation register 29 conditions the location verifier and recycle controls 250 for a similar location check after which it operates certain latches to permit the read operation to be initiated when an end of gap signal S, FIG. 16, is presented to the timing pulse generator 68, FIG. 1. Under these conditions, the data read from the track is directed over read bus lines 72' and 72 through a serial-parallel translator 73 to the bit drivers 47 in the core storage 36 for further processing.

Referring now to FIG. 7, coded information or data is magnetically stored on the discs 55, which include a coating of magnetic material on both sides or faces. In this particular instance, each random access file unit 37 includes 50 axially spaced discs which are mounted on the vertical shaft 56 for rotation at a substantially constant speed of 1,200 r.p.m. Because the discs are coated on both sides, each file unit contains 100 disc faces. The reading and writing of data on the surface of these discs are performed by any of the read/write heads 59 carried by the access arms 58. Each access arm is mounted on a vertically movable carriage 74, FIG. 3, disposed adjacent the outer periphery of the discs and is capable of rapidly moving up or down to any disc. The magnetic read/write heads on each access arm 58 are moved radially across the disc faces to locate the desired track of data on the disc. In this modification, three mechanically independent access arms 58 are provided for each random access unit 37, and each arm can be independently directed to any disc track therein. This independent operation of the three access arms permits concurrent processing of three records. FIG. 7 is a schematic view of the disc face arrangement. It is to be noted each arm 58 can straddle any disc as it moves radially across seeking the track. Each arm has two read/write heads or transducers 59, the upper head is for the top sides of the discs and the lower heads read and write on the bottom sides of the discs.

Each of the 100 disc faces in the random access file unit is further subdivided into tracks. Each disc face has 100 tracks and each track has a capacity for storing 600 digits of data plus 60 sign indications. Thus, one random access file unit 37 contains 600 data digits per track, 100 tracks per disc face and 100 disc faces per unit or a total of 6,000,000 digits. The 600 digits per track are arranged in word lengths of 10 digits and sign per word. This is shown in FIGS. 10 and 11, respectively. A track therefore has a capacity of 60 words of data which may be defined as the word group 44 and 4 digits of address 25.

Access to information on any track is obtained by programming. An operation code seek directs one of the access arms 58 to the desired disc face and track. An operation code of read or write is then given. The read instruction results in a check of the address, and if correct reading all the data from the entire selected track and places the same in the same digit order in the immediate access or core storage 36, where it is made available for processing under normal program control. If an error occurs, the access arm is directed to an articial address and then recycled to find the correct one.

The write instruction results in an address check and if correct rewrites the address and stores the entire contents of immediate access or core storage 36 (600 digits plus signs) on the designated track as a word group 44. Either alphabetic, numerical, or special character data can be stored in the random access storage unit. Alphamerical and special characters are stored in the same two-digit numerical form as described in the abovementioned Greenhalgh patent.

Checking means, not shown, for the data is provided which insures correct transmission to and from the random access storage unit 37. Information from core storage is preferably checked for validity (missing or extra bits) whenever data are either read in or read out.

After a track is written in the random storage unit 37, the track is immediately read back and checked against that in the core storage 36, thus insuring correct writing of the stored information. If for some reason an error is detected, the track is automatically rewritten and checked again until a correct check is obtained. This operation will be hereinafter discussed more fully.

It is intended that the random access data storage units 37 be permanent storage because data will remain stored indefinitely and may be read out as many times as desired. Data in storage is only changed by a write instruction, which erases a previously recorded digit as the new digit is written.

The magnetically recorded information stored in the random access storage unit appears serial by digit, and serial by bit, as shown in FIGS. 15 and 16. The conversion from serial-serial in the storage unit 37 to serial by digit, then parallel by bit in the core storage 36 is automatically handled whenever data are transferred between the two storage media.

The schematic FIG. 7 shows the track and word arrangement for a disc face. Track 00 is the outer track, and track 99 is the inner track. The total circumferential length of a track is approximately 62 word lengths, where two word lengths constitute a gap or space 75, FIGS. 8, 16, and 18, followed by the location verifier or track address digits and 60 words of data. It is to be noted that the gap 75 and data words on a track have no physical location or fixed reference to corresponding spaces 75 and data words on any of the other tracks. This will be hereinafter more fully described.

As mentioned previously, each random access storage unit 37 contains 10,000 addressable tracks. The address 76, FIG. 13, for each track is a six digit code that specifies disc storage unit, disc faces, track and access arm, and is constructed as follows:

Disc storage unit numbers 0–9 (D6)
Disc face numbers 00–99 (D5–D4)
Track numbers 00–99 (D3–D2)
Access arm numbers 0–2 (D1)

The remaining digits in the word 64 are not used with a random access unit address. As an example (an address of 2–04–91–1 specifies disc unit 2, disc face 04, track 91, and access arm 1.

| File Unit | Disc Face | Track | Access Arm |
|---|---|---|---|
| 2<br>D6 | 04<br>D5-D4 | 91<br>D3-D2 | 1<br>D1 |

Another example of a RAM address:

| File Unit | Disc Face | Track | Access Arm |
|---|---|---|---|
| 0 | 00 | 00 | 0 |

This example specifies file unit 0, disc face 00, track 00 and access arm 0.

| File Unit | Disc Face | Track | Access Arm |
|---|---|---|---|
| 3 | 99 | 99 | 2 |

The foregoing address will direct access arm 2 to the last track 99 on disc face 99 in file unit 3.

The random access complete addresses are placed in the distributor 34 by programming whenever reference to a disc unit 37 is desired. The six-position address constitutes the low order 6 digit positions of the distributor word. A subsequent random access operation code automatically refers to the distributor for the random access address.

FIG. 7 shows the disc face arrangement in the random access storage unit. Disc face 00 and 50 share the same disc. Disc face 01 and 51 are on the second or next disc below. It will be noted that the disc face address of the bottom of a disc is always 50 greater than the address of the top face. This aids in the head selection circuitry when reading or writing on the upper or lower surface of the discs.

Three operation codes are provided to the calculator programming for random access storage unit control: Seek, Read, and Write. Each of these operation codes requires that the D-address 25 of the instruction word 24 be 9,000. In the case of the read and write operation codes, this D-address activates the core storage 36 to function in the transfer of data from and to the disc file unit 37. However, the random access unit six digit code address must be in the distributor 34 when any of the above three random access instructions is initiated.

The function of an 85 operation code instruction (seek) is to cause one of the access arms to move to the disc face and track specified by the random access address located in the distributor 34. The time required for the access arm to seek and find the specified disc and track varies with the distance it has to move. In this embodiment, if the address specifies a track on the same disc that the access arm is now on, the access time is about 150 to 300 milliseconds.

When the address instructs the access arm to move to another disc, the access time is greater. The maximum access time for a seek operation is approximately 800 milliseconds. To illustrate the variation in access time, a seek operation that directs the access arm to move 25 discs take about 500 milliseconds. When an access arm moves the maximum distance of 49 discs on a seek operation, the access time can be up to 800 milliseconds.

Because data are recorded on both sides of a disc, track 00 of disc face 00 is directly above track 00 of disc face 50. Therefore, if the access arm is located on track 00 of disc face 00, the minimum access time for a seek operation would be to track 00 on disc face 50. This access time is about 30 milliseconds. This access time overlaps the calculator programming. The calculator is interlocked only for 2 word times (192 microseconds), which is the time it takes to transfer the random access address from the distributor to a random access address selection unit 77, FIG. 2*a*.

The D-address 25 of the seek instruction is 9,000, and the six digit random access address 76 must be in the distributor 34 for the 2 word times during which the seek instruction is initiated.

A write random access operation code 87 presumes that a previous seek instruction 85 has positioned the desired access arm 58 at the correct track. If the seek operation has not been completed, the write instruction automatically waits until the read/write head 59 is in position on the designated track.

The function of the write operation code 87 is to cause a reading of the location verifier address digits and a comparison with a stored value of the desired address before causing the entire contents of the core storage 36 to be recorded on the selected track. The D-address 25 of the write random access instruction is 9,000, and the six digit random access address 76 must be in the distributor 34 for the 2 word times during which the seek instruction is initiated.

The write random access disc unit operation begins by checking the address in the distributor 34 to insure that the correct track has been selected by the prior seek instruction. As soon as the address is checked and confirmed, a write operation signal causes the location verifier and recycle controls 250 to effect reading of the location verifier address digits of the track and compare them with the stored value of the address, after which the write operation begins. Any previous data on the track are erased as new data are written. Approximately a four-word length erase gap 78, FIG. 17, is provided and then the four digit address is rewritten, followed by writing the 60 words of data from the buffer core stage 36, FIG. 1. Writing the 60 words provides the gap 75, FIG. 18, which is approximately 2 words in length, between the first and last bit recorded to designate the starting point of the data on the track for future random access read operations. Each time data are written on a track, the four digit address is checked, the previous data are erased, the four digit address is rewritten, and a new two-word gap 75 and data recording are made. This writing of data takes one revolution of the disc 55.

As each digit is read out from the core storage 36, it is checked for validity, by means not shown. However, to insure further that correct data were written on the track, an automatic write-check cycle is taken. The write-check cycle causes both the newly recorded track and core storage 36 to read out their data serial by digit through switch means 249 to a write character comparing unit 79, FIGS. 1 and 5*c*. This comparing unit checks each digit written on the track against the corresponding digit from the core storage for identical code structure for validity. The write-check cycle also takes one revolution of the disc.

The write random access instruction requires approximately 120 milliseconds. This is composed of 2 disc revolutions of 50 milliseconds each and 20 milliseconds of setup time. The core storage unit 36 is interlocked for the complete 120 milliseconds. Therefore, the calculator can be programmed to execute other instructions that do not refer to the core storage unit, while the write random access instruction is being executed.

A read random access operation code 86 presumes that a previous seek instruction has positioned the selected read/write head 59 at the correct track. If the seek operation has not been completed, the read instruction automatically waits until the read/write head is in position on the designated track.

The function of the read random access operation code 86 is to cause the controls 250 to check the track address, and if correct, to read an entire track of 600 digits of data and place it in the buffer storage unit 36. The D-address 25 of the read instruction is 9,000, and the six digit random access address 76 must be in the distributor 34 for the 2 word times during which the instruction is being initiated, the same as during a write instruction.

The read random access operation begins by checking the address in the distributor 34 to insure that the correct track has been selected by the prior seek instruction. As soon as the address is checked and confirmed, the read operation begins searching for the two-word length space 75 on the track and reading the four digit address. This space indicates the starting point of data previously written on the track. Because the discs 55 are continuously rotating, the space could be immediately available or a maximum of a complete disc revolution away from the associated read head 59. When the track space is recognized, the location verifier track address digits are read and compared in the comparing unit 79 with the address from the distributor 34 which is stored in address relays forming part of the seek servo-control 61, if a valid comparison is made, the entire track of 600 digits of data is read and transferred to the core buffer storage unit 36 in the time it takes for one revolution of the disc. As each digit is read from the track, it is checked for validity, by means not shown. If a validity error is recognized, the track is again read into the core storage and a validity check is made on the transmitted data. If the validity error persists, the read operation is repeated until a correct transmission of all 600 digits is made to core storage or until manual intervention by the operator halts the operation. If a compare error results, the recycle portion of controls 250 causes the control 61 to move to a false or fictitious address and then recycle in an effort to find the correct address.

The total time for a read random access instruction varies from approximately 70 milliseconds to 120 milliseconds. This maximum limit assumes that the transmitted data satisfactorily pass the validity check. An average time for a record operation is 95 to 100 milliseconds. The read random access storage timing is comprised of 20 milliseconds setup time; 50 milliseconds to read the complete track; and a variable time from 0 to 50 milliseconds, which is dictated by the proximity of the track space 75 to the read head 59 at the beginning of the read operation. Immediate access core storage 36 is interlocked for the entire read random access operation. The calculator is interlocked for only 2 word times (192 microseconds) and is free to execute other instructions that do not refer to the core storage unit.

Referring now to FIG. 8, the top plan view of disc face 00 is shown along with a number of the 100 circular tracks or data storing paths. It is to be understood, of course, that these tracks of stored data are genertaed by rotation of the disc 55 past the read/write head or transducer 59 after the latter has been radially positioned at one of the 100 possible track positions by its related access arm 58. Since each disc face with the tracks thereon is identical, the description will be confined to one track and one disc face with the understanding the same description would be applicable to all tracks and disc faces.

As previously mentioned, each circular track is approximately 62 words in length and the data defining the 4 digit track address and a word group of 60 words, word 00 through word 59, occupies slightly more than 60 words of this track to leave the approximate two-word gap or space 75 between the first and last recorded bits S and 79, respectively. Since the circumference of each track varies in length from track to track, moving in a radial direction, it can be seen that the circumferential length of each digit position and word will vary accordingly. Thus, the distance between each bit recording will not be uniform. However, this will not affect the reading and recording operation because the time required for the disc revolution is the same per revolution. Since the read and write mechanisms are not sensitive to the length of space between bits, the particular length of a bit position has no bearing on the read and write operations. In this embodiment, the nonreturn-to-zero, NRZ, type of recording is utilized as diagrammatically shown in FIG. 16. A more complete description of the means for accomplishing the NRZ flux pattern appears in B. E. Phelps application, Serial No. 264,341, filed December 31, 1951, now Patent No. 2,774,646, issued December 18, 1956.

FIG. 16 is intended to represent the flux pattern, indicated as a continuous line 81, on a track for an arbitrary word of data, along with the 4 location verifier track address digits which may be recorded initially at the beginning of the track, and the gap or space 75 between the beginning and end of a word group 44. When the flux line 81 is down, it is assumed the magnetism along that portion of the track is negative or in one direction, and when the flux line is up, the magnetism along that portion of the track is positive or in the opposite direction. It is only at the point of change in flux, indicated by the vertical lines and defined as a bit position, that the sensing equipment responds to generate an output signal which is directed to suitable apparatus for decoding or recording for further use. Likewise, during writing, each delivered bit causes reversal of the current in the read/write head 59 to change the flux pattern on the surface, as indicated.

The digit positions D0–D10 follow serially along the track and each digit position is further subdivided into weighted bit positions, as shown in FIG. 15, to provide S, 6, 3, 2, 1, and 0 serial bit locations for each digit. Thus, to record a decimal 6 serial by bit, a change in flux must occur at the 6 and 0 bit times or locations. While FIG. 16 shows a vertical drop at 6 bit time and a rise at 0 bit time, this could be reversed because the sensing means only detects the change in state and not the direction or the duration.

In FIG. 16, it is assumed the group of words have been written on the track and the S bit, to be hereinafter described, at the beginning or space bit position of the first digit has been generated to signify or indicate the end of gap or space, and this is followed by the 4 location verifier digits of the track address and the word group recorded serial by bit, digit and word in the manner indicated.

By way of example only, location verifier address digits for track 50, disc 01 and an arbitrary numeric word of data 76105983512 are indicated in word 00. With the beginning of the first location verifier address unit, the flux pattern changes to the positive or up position at the S or space bit position of the first or units position and this state continues until the 3 bit position is reached. At this point, the flux pattern is again reversed to its negative or down value and so remains until the 2 bit position is reached. At this time, the flux again reverses to the positive value and the 2-out-of-5 reading for this particular first location verifier digit position has been completed and a decimal 5 has been indicated. The same pattern occurs for the units position of the track address, which is storing a decimal 0. However, the flux reversals occur at the 2 and 1 bit positions instead of the 3 and 2 bit positions. The remaining numeric values follow in the same manner.

It will be noted that each digit position includes a change in flux at two and only two bit positions within the digit to always return the flux pattern to the same side as it crosses from one digit to the next. Also, that the S or space bit positions of the digits following the location verifier digits, are left blank. As reading of the 4 location verifier digits is completed, digit D0 of word 00 immediately follows, and this occurs serial by digit from word to word.

At the space bit position of digit D10, word 59, a second S bit signal is provided prior to the last two bits of the last digit. This second S bit is necessary to provide an even number of bits or flux changes along the track or path so that the flux pattern returns to its original space indicating position in a uniform manner. With the group of words recorded on the track, the data may be permanently stored and read in a nondestructive manner whenever desired.

Should it be desired to modify the data or any part thereof in the track, the track address and this data are read, the address is compared and the data are directed to the core storage 36 for processing or modification in the calculator. When the data are properly rearranged for recording, the random access write operation code 87 initiates a recording or write operation. With the selected read/write head positioned at the track, an address comparison is made, and an erase operation is immediately initiated following verification of the address.

As shown in FIG. 17, for example, the previous space between the recorded word group is arbitrarily located at the left-hand side of the sheet. Since the write signal is received as soon as the 4 address digits 25 are compared without error, all previously recorded data following the location verifier digits are erased or removed by continuously driving current through the transducer or read/write head 59 in one direction to drive the flux pattern down or negative. This continuous erase operation extends for approximately 4 word times and is controlled by a suitable clock driven gap ring. At the end of the four word erase, an end of gap or S bit signal is automatically generated and recorded on the track by changing the direction of the flux at the read/write head 59 at the space bit timing or beginning of a digit. The 4 location verifier address digits are then rewritten, and from this point on, the 60 words of data are recorded in the manner previously described. The recording of the new data erases any of the previous data at the particular location before recording takes place.

As shown, the fifty-ninth and sixtieth words will be recorded in the forward or initial portion of the erased section of the track. While the modification discloses approximately a two-word overlap into the erased section of the track, it is to be understood that this overlap can vary in either direction. In fact, it would only be necessary to overlap by one digit or bit position. However, due to the separate driving means which provide variable conditions with respect to disc rotation and clocking pulses, the additional overlap provides a margin of safety to insure the removal of any of the previously recorded data.

FIG. 19*a* diagrammatically indicates the beginning of a recording operation; FIG. 19*b*, the end of the erase operation; FIG. 19*c* shows the recording operation in progress; and FIG. 19*d*, the end of a recording operation with the recording overlapping in a portion of the erased section.

After the recording operation is completed, the newly recorded gap 75 must always be sensed before a reading operation can be initiated.

Should it be desired to modify the data on any track, the previously described procedure is followed. Thus, it can be seen that each write operation may be initiated only after an actual check of the track address, and the start is moved along the circumference of the track by the distance of the gap, and this procedure in writing occurs with each recording on the same track. When an error in locating the head occurs, automatic recycling is initiated to reseek the correct address. Likewise, the writing may occur along the circumference of any of the tracks without regard to the circumferential location of the starting positions of any of the word groups on any of the other tracks. This same condition prevails from disc face to disc face and disc storage unit to unit. A recording operation of this type is effective to decrease greatly the time lost from erroneous operations, and reduces greatly loss of stored information by reason of erroneous erasure. In this manner, transient or intermittent errors caused by disc runout, worn tracks, dirt, etc., can be corrected by recycling, without causing stoppages.

*Circuit Description*

Figure 2A:
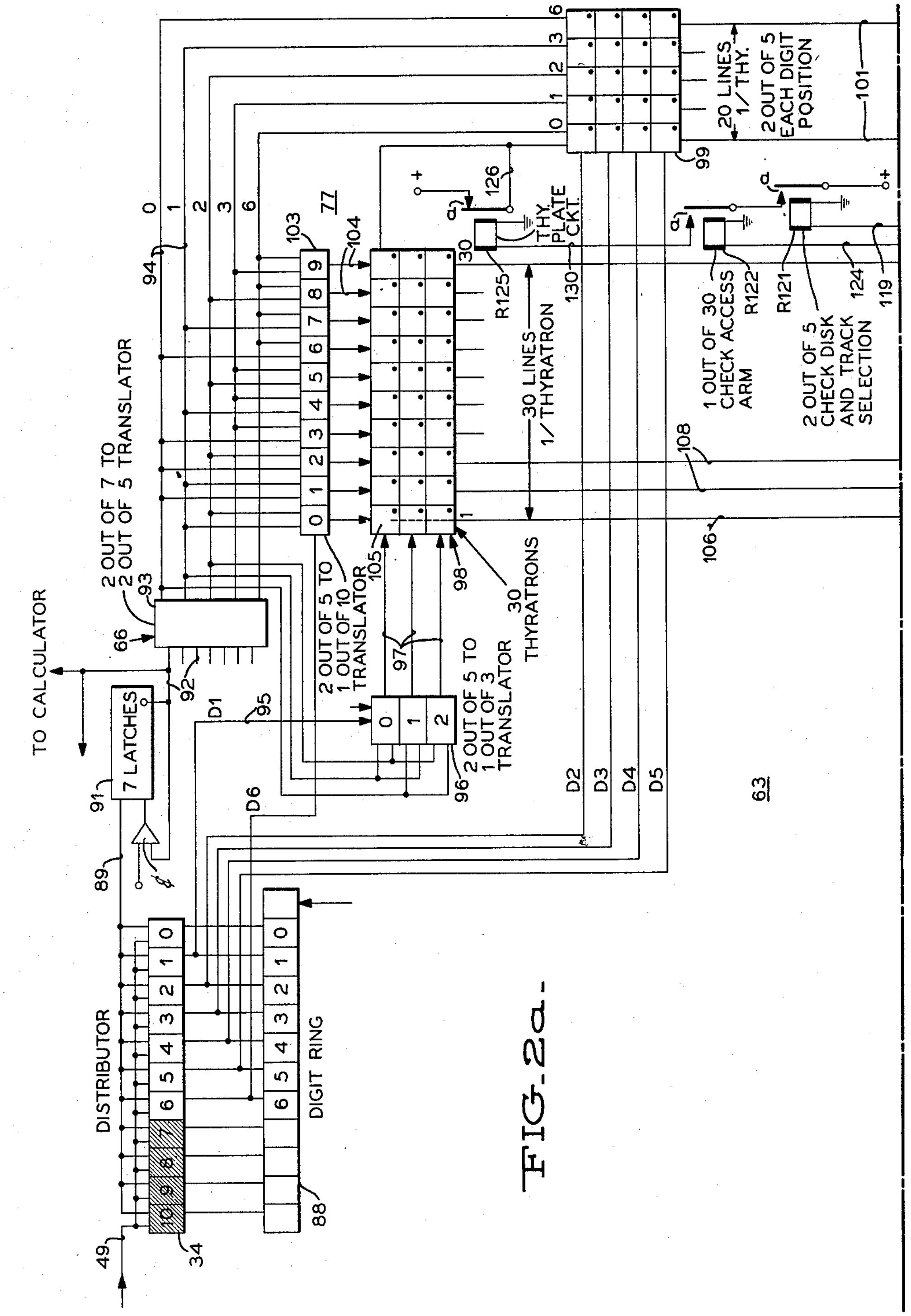

Referring now to FIGS. 2*a* and 2*b*, 3, 5*a* to 5*d*, and 6*a* to 6*c*, for a more complete description of the more essential circuitry required for operation of the random access storage unit 37, only the distributor 34, FIG. 2*a*, of the calculator 21 is shown. The disc storage unit address 76 may be taken from an address on the drum 22, FIG. 1, and loaded into the distributor under control of an instruction supplied by the operation and address registers 28 and 29, respectively. It is to be noted the random access address 76 occupies 6 digit positions D1 to D6, inclusive, of the word. The remaining digit positions in the word are ignored. However, zeros are normally inserted at D0 and D7 through D10 to satisfy the validity check for the calculator system.

After the distributor 34 is loaded with the random access address, the next instruction appearing in the operation register 29 may be a seek instruction code 85. A seek instruction operates over a line 66 and enables switching to permit operation of the seek controls 63. At the proper time, a distributor digit ring 88 is operated to drive the instruction for readout. As readout occurs from the distributor parallel by bit and serial by digit over seven biquinary lines 89, only one of which is shown, the related latches 91 are operated to condition lines 92 (see FIG. 2*a*) leading to a translator 93. These seven input lines are weighted in the order shown in FIG. 21 and the output from the translator 93 provides a 2-out-of-5 bit code over parallel output lines 94 weighted as shown in FIG. 22.

At D1 time, a digit ring D1 line 95, FIG. 2*a*, operates a 2-out-of-5 to a 1-out-of-3 translator 96 which switches a decimal 0, 1, or 2 representation appearing on the output lines 94 to condition, over a line 97, one control grid each of ten thyratrons arranged in one row of a three-row, thirty-access relay gas tube or thyratron matrix 98. Translating a value at digit D1 time indicates which access arm 58 (0, 1, or 2) is to be actuated in a yet-to-be selected disc storage unit 37. Thus, a translated 0 indicates access arm No. 0 of one of the units, a translated 1, the No. 1 arm of a unit, and a 2, the No. 2 arm of a unit. In this example, it will be assumed that a decimal 0 appears in digit D1 position of the distributor 34; therefore, the grids of the ten thyratrons in the row associated with the 0 output line 97 of the 1-out-of-3 translator 96 is conditioned.

At digit times D2, D3, D4, and D5, the output from like data storing positions in the distributor feed through the translator 93 to condition various control grids arranged in five columns in a twenty-disc and track gas tube or thyratron matrix 99. The other grids in this matrix are consecutively conditioned row by row at digit times D2, D3, D4, and D5 by the output of the related digit rings. Wherever coincidence occurs between the conditioned row and columns corresponding to the readout from the distributor for that digit position, two of the thyratrons in the row will fire and remain conducting. Thus, at digit 5 time, eight of the twenty thyratrons will be conducting over separate lines 101 in parallel to a plurality of address relays 102, FIG. 2*b*, forming part of the seek servocontrol 61, FIGS. 1 and 3. There is one set of address relays 102 parallel connected to the twenty thyratron matrix 99 in an identical manner for each access arm 58 in each disc storage unit 37.

At digit 6 time, the desired disc unit selection data is delivered over the lines 94 to a 2-out-of-5 to 1-out-of-10 translater 103 which is simultaneously gated with the digit D6 ring output. As the translated value leaves this latter translator over one of the lines 104, it conditions one of 10 columns in the access relay thyratron matrix 98. In this manner, coincidence occurs at one of the thyratrons in one of the previously conditioned rows. In this example, it will be assumed that the upper left-hand corner thyratron 105 in the thirty thyratron matrix 98 fires and conducts over the line 106. During this interval, the remaining 29 lines 108 leading to individual access arm relays R109 are down or in their not-conducting state. The line 106 extending from the thyratron 105 is connected to the access arm relay R107 which, under the above conditions, is picked to transfer a plurality of contacts 111, some of which are connected to the output from the twenty-disc and track thyratron matrix 99 over the lines 101.

As the above relay R107 transfers, the output from the 8 fired thyratrons conducts over their respective lines 101 and related contacts 111 to associated pick and hold relays in the address relay array 102. The affected relays are energized and transfer a group of contacts, not shown, in relay tree networks 112 and 113, respectively, FIG. 3, but shown in FIG. 4, and hereinafter described somewhat more in detail in connection therewith, in any suitable manner.

Figure 2B:
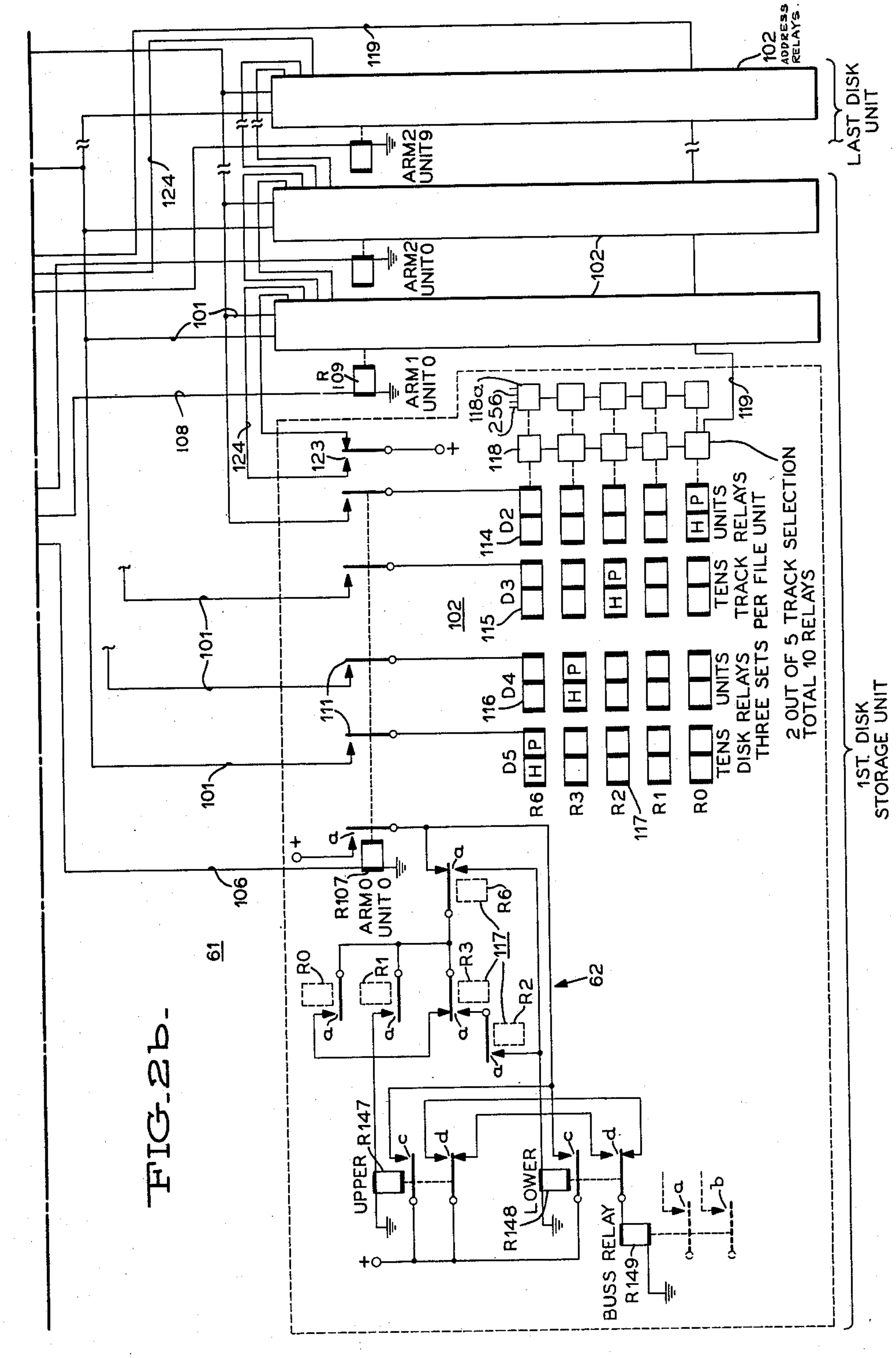

Each array of address relays 102 is arranged in four columns, 114, 115, 116, and 117, respectively, FIG. 2*b*, of five relays, R6, R3, R2, R1, and R0, each of which are weighted to provide the 2-out-of-5 6, 3, 2, 1, 0 code. Two of the groups, columns 116 and 117, are defined as disc address relays and the remaining two, columns 114 and 115, as track address relays. As shown, columns 114 and 115 correspond to the units and tens position in the D2 and D3 positions of the distributor 34, FIG. 2*a*. Likewise, columns 116 and 117, FIG. 2*b*, correspond to the units and tens position in the D4 and D5 positions in the distributor. Thus, every address value appearing in the D2–D5 positions in the distributor will eventually appear in the 2-out-of-5 code in one of the address relay arrays 102 to provide for the units and tens values for disc and track selection.

As two out of five of each of the columns of relays pick, a group of diagrammatically indicated 2-out-of-5 check contacts 118 in each column are transferred which fed serially through each array in any suitable manner and over a line 119 to a 2-out-of-5 check disc and track selection relay R121, FIG. 2*a*. Also transferred are address relay contacts 118a which serve to store the track and disc address digit of the selected arm location. If the proper pairs of address relays have been picked, relay R121 is energized to close its related contact R121*a* which in turn is in series with a 1-out-of-30 check access arm contact R122*a* associated with a check access arm relay R122. Associated with each access arm relay R122 are a plurality of series-parallel connected checking contacts 123, FIG. 2*b*. If only one out of thirty of the access arm contacts 123 has been energized, access arm check line 124 conducts and contact R122*a*, FIG. 2*a*, is transferred to complete a circuit over a line 130 leading to a thyratron plate circuit relay R125. Transfer of the associated contact R125*a* is operative to open the plate circuits 126 leading to all of the thyratrons in both matrices 98 and 99 to extinguish any of the fired thyratrons. Opening of the plate circuits will release access arm relay R107, FIG. 2*b*, to return the related contacts to their normal open condition. However, the two picked relays in each of the four columns in that particular address relay array 102 will remain transferred. The matrices are now in condition to process the next random access address to set up other access arms associated with the same or other disc storage units. In this manner, all three arms may be consecutively addressed to different tracks and the access arms can be all simultaneously moving to their respective tracks.

Figure 4:
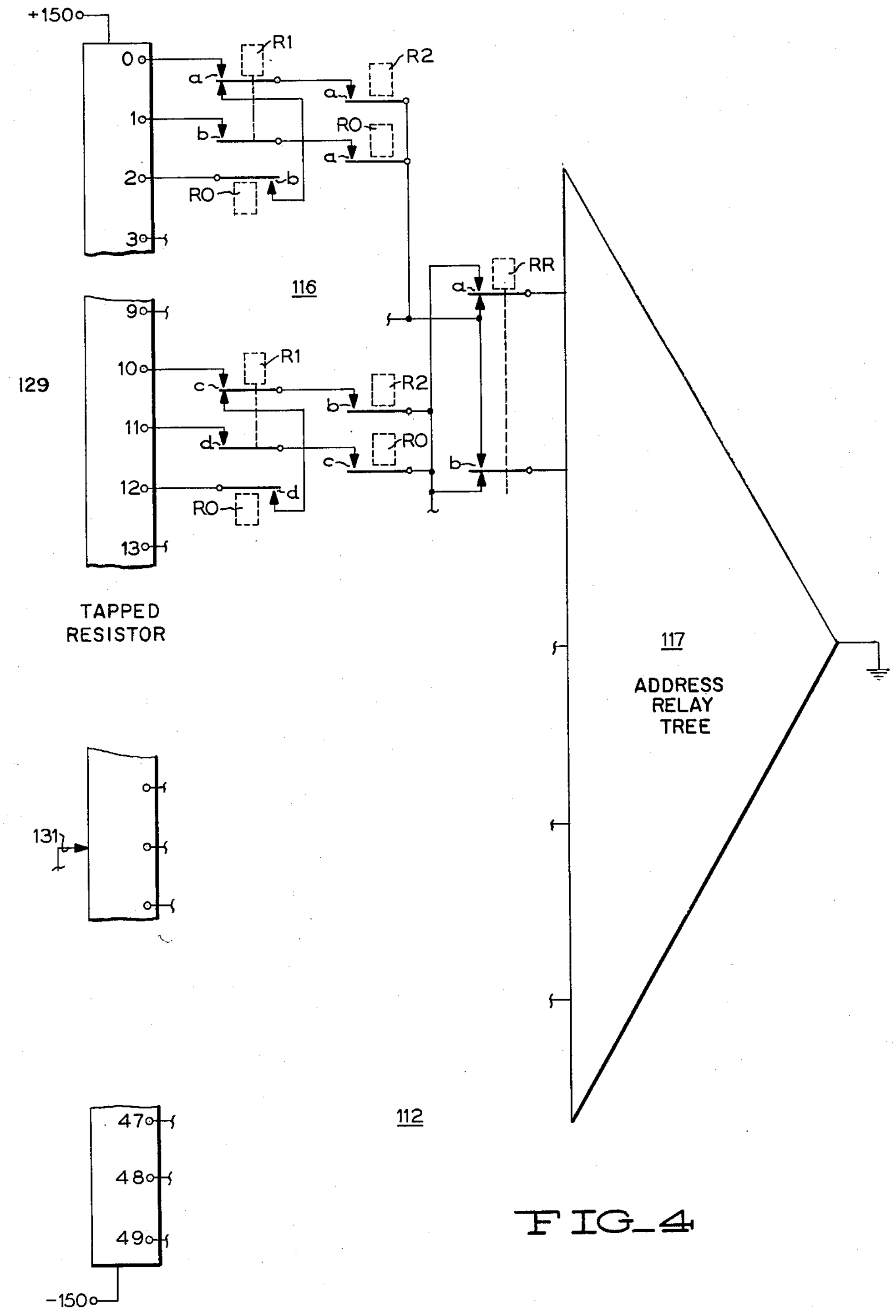
FIG. 4 represents schematically and in part circuit means for setting up a false or fictitious address to cause recycling of an arm.

As the address relays 102 are energized, the disc relays in the columns 115 and 116 selectively transfer a group of contacts in the relay tree 112, FIGS. 3 and 4, to complete one of a plurality of single circuits 127 from a ground to a floating power supply included as part of an electromechanical servomechanism 128 for directing the access arm to a particular disc. This includes a tapped variable resistor 129 and a related wiper arm 131 carried by the vertically operated access arm carriage 74. In addition, the relays in the track address columns 114 and 115 operation through the double tree 113 in any standard manner to provide a null point on the related resistor 132, which in turn is associated with a wiper arm 133 carried by the related access arm 58 for directing the head to a particular track on the selected disc.

As shown in FIG. 4, a recycle relay RR is provided in the relay tree 112 of FIG. 3 having contacts connected in the several circuits between the units address relays of column 116 and the tens address relays of column 117. Normally closed contacts cooperate with armatures *a* and *b* to provide circuits, for example, one of the "0," "1," and "2" disc taps of the resistor 129, through armatures of relays R0, R1, and R2 of column 116 depending on which of relays R0, R1, R2, etc., are picked. Operation of relay RR changes these circuits as shown to provide a ground through one of the "10," "11," and "12" disc taps, respectively. Other circuits are similarly changed by operation of relay RR to provide for any particular track selected, a fictitious disc address ten discs removed to cause the head to proceed to the fictitious address, for the purpose of recycling to the correct address in the event of an error in location, as will be hereinafter described.

The particular selection of the address relays determines the null points at the related resistors which in turn determines the direction of movement of the related access arm 58. For example, if the access arm is to move from a track on disc 1 to a track at some other location on another disc, the disc and track relays are operative to establish the various potentials which determine the direction of access arm movement. In this case, a constant speed motor 134 operates a differential 135 to drive a reel 136 in opposite directions under the control of a pair of direction control clutches 137. Selective operation of the clutches 137 is determined by a clutch amplifier 138. In this manner, the rotation of the reel 136 is such as to retract the arm 58 from the associated disc by reeling the drive cord 140 in the proper direction. As this occurs, an abutment 139 actuates a contact 141 to energize a relay R141 which in turn operated through contact R142*a* to permit the vertical or disc relay tree 112 to now control vertical movement of the access arm 58.

As the access arm 58 approaches the proper disc, the wiper contact 131 reaches the null point which in turn operates through a null amplifier and a coil 143 to energize a disc detent 144 to prevent further vertical movement of the access arm. Operation of the detent 144 insures that further rotation of the motor driven reel 136 will move the access arm radially in the direction of the desired track, the wiper 133 engages the related null point of the resistor 132 which is effective to energize a coil 145 to drive a track detent 146 to home position. Thus, the read/white heads 59 on that particular access arm are positioned in accordance with the instruction initially placed in the distributor.

Disc and track null relays DN and TN are provided in conjunction with a position found relay PF and a normally open track detent switch 146*a*, operated by track detent 146, which is positioned by solenoid 143 when the wiper 133 engages the null point of resistor 132. A time delay relay TD, energized through armatures *d* and normally open contacts of relays DN and TN, and normally closed detent switch 146*b* provides for operation of recycle relay RR in the event that the track detent switch 146 fails to close within a predetermined time after the disc and track null relays DN and TN pick.

The above briefly describes a seek operation and merely generally discloses an electromechanical servomechanism to move a read/write head or transducer 59 from one location to another. A more complete description of the exact operation of a suitable device of this type is more fully described in the above-mentioned Stevens et al. application. It is to be understood, however, any suitable servomechanism may be utilized to shift the access arm 58 to the desired location.

Each unit may include any number of access arms 58 identically operated; however, in this embodiment, the optimum appears to be three access arms per disc storage unit.

When the access arm selection relay R107, FIG. 2*b*, transfers, a related contact R107*a* closes, and certain of the relay points in the column 117, representing the tens position of the disc address relays are transferred. The closure of the various contacts determines whether the upper or lower read/write head or transducer 59 of that particular access arm 58 is to be utilized. For example, if the tens position of the disc address includes a 0, 1, 2, 3, or 4, contacts R0*a* and/or R1*a* close or R3*a* remains normal and the upper read/write head relay R147 on the selected access arm is energized to close related contacts R147*a* and R147*b*, FIG. 5*d*. Closing of these contacts permits the upper transducer to read or write on the upper faces of any of the 50 discs, 00 to 49. If a 5, 6, 7, 8, or 9 appears in the tens position, transferred contacts R2*a* and R3*a*, FIG. 2*b*, in series or R6*a* alone energizes lower head relay R148 to close related contacts R148*a* and R148*b*, FIG. 5*d*, to condition the lower read/write head of the selected access arm for all lower disc faces 51 to 99 in the same manner.

Figure 5A:
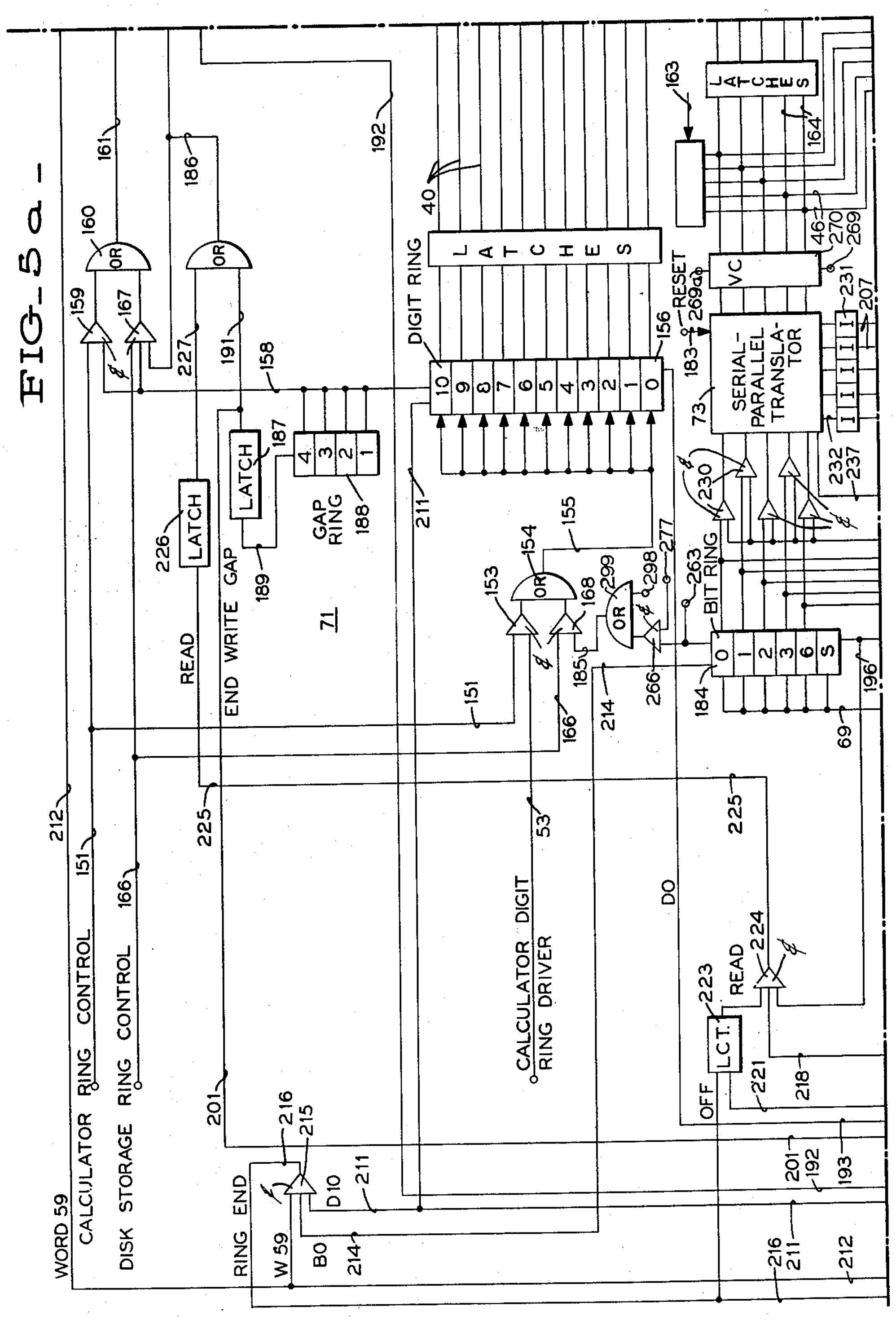
Figure 5B:
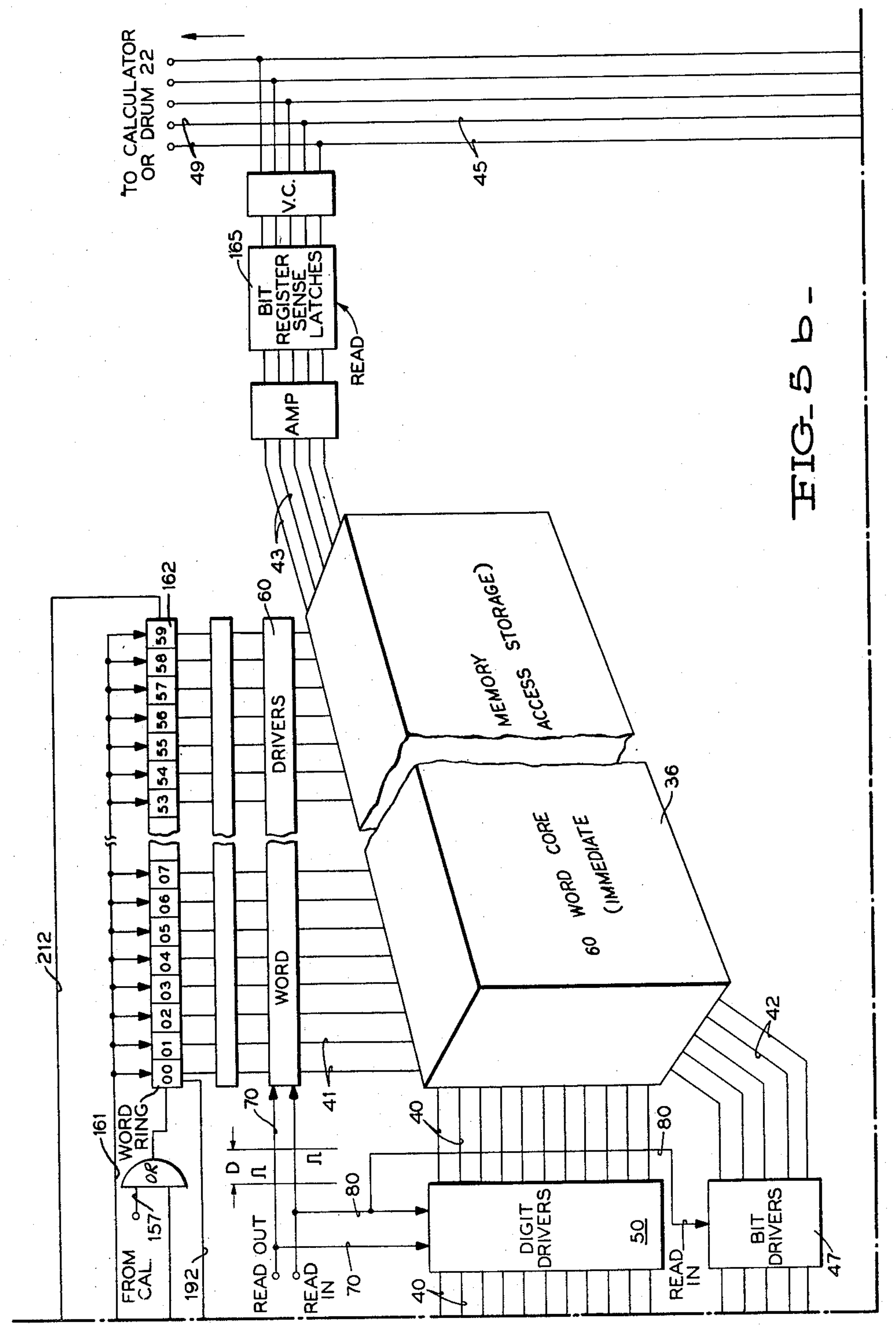
Figure 5C:
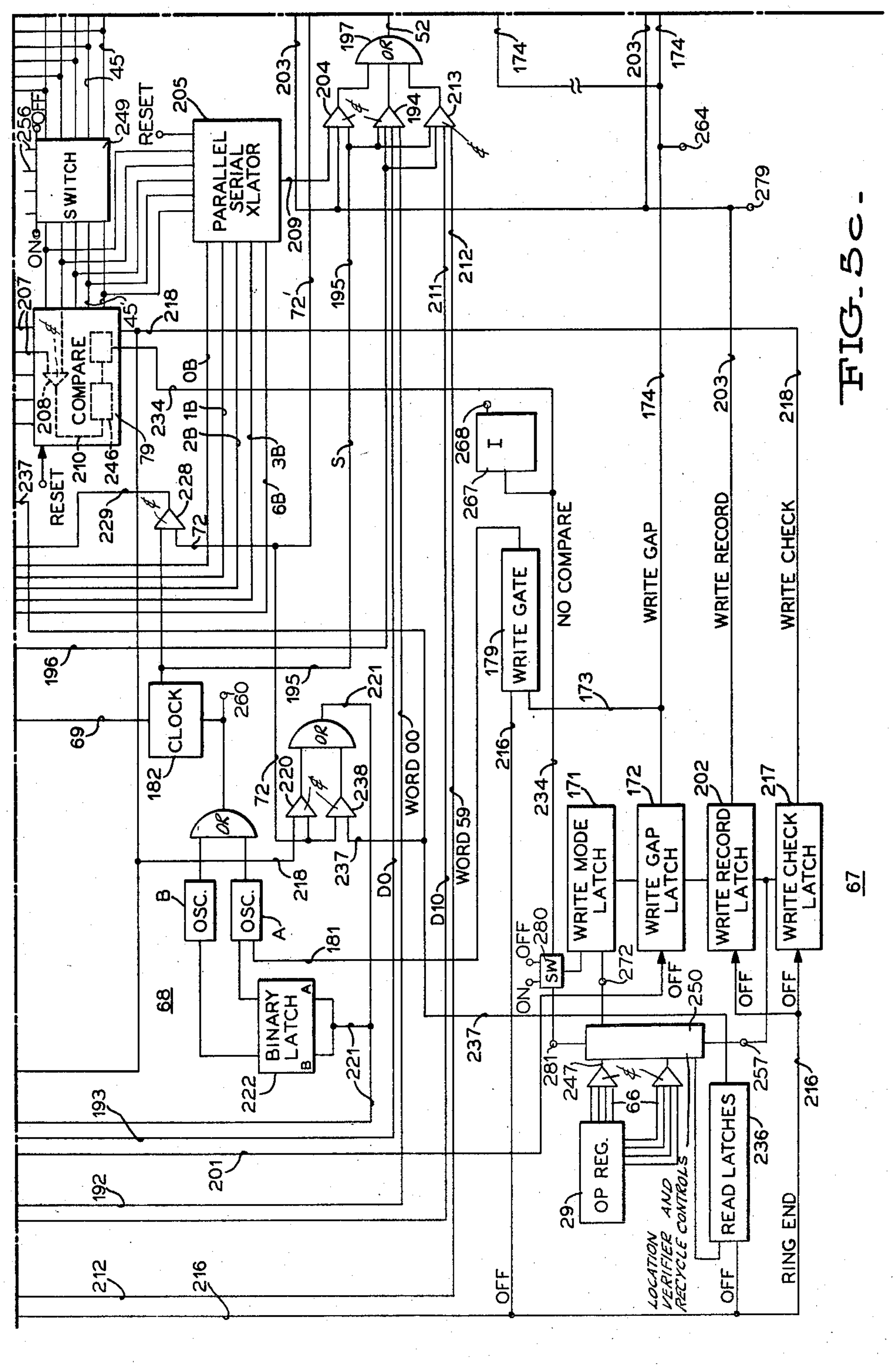
Figure 5D:
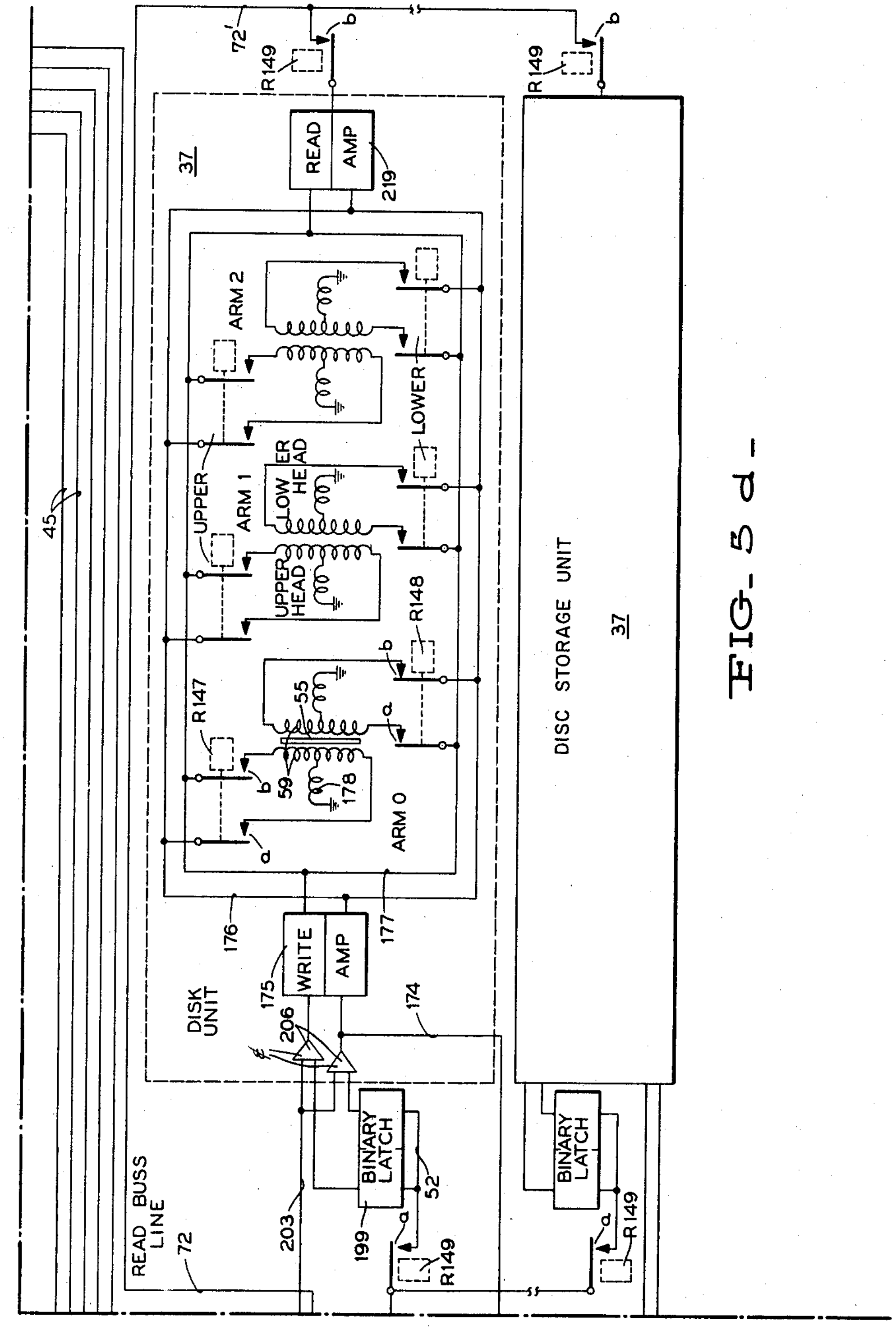

When either the upper or lower head is selected, one of the contacts R147*c* or R148*c*, FIG. 2*b*, transfer to energize a bus line relay R149 which closes related contacts R149*a* and R149*b* to provide a disc storage unit selection, see also FIG. 5*d*. With an arrangement of this type, a plurality of disc storage units 37 may be connected to the same input and output lines 52 and 72, respectively. Each group of address relays includes similarly operated upper, lower and bus line relays which operate in the same manner. Since the particular relay design forms no part of the invention other than to control which unit and head is made operative, a further description is not deemed necessary.

Referring now to FIGS. 5*a* to 5*d*, there is diagrammatically shown a control arrangement for transferring data from the temporary buffer or core storage device 36, FIG. 5*b*, to a selected track in one of the disc storage units 37, FIG. 5*d*. Assuming first that data is to be placed in the core storage from an external source, such as the data processing machine or drum storage 22, FIG. 1, the calculator ring control line and calculator digit ring driver lines 151 and 53, respectively, FIG. 5*a*, are raised to condition a diode switch 153 which conducts through a diode mix 154 over a line 155 to digit 0 of the closed digit ring 156. At the same time word ring 00 is conditioned over a line 157. Consecutively received digit pulses, supplied from the drum driven timer 54 over the digit drive ring line 53, advance the digit ring 156 digit by digit. Each complete cycle or revolution of the closed digit ring 156 provides a signal over a line 158 leading to a diode switch 159 which is conditioned by the calculator ring control line 151 to drive a pulse through a diode mix 160 and over a line 161 to advance the word ring 162 one word, FIG. 5*b*.

During this interval, the words of data to be stored are delivered from the drum 22 over the lines 163 and 164, FIG. 5*a*, and is presented parallel by bit and serial by digit to the bit drivers 47, FIG. 5*b*, associated with the inhibit lines 42 for storage in the conditioned digit position and word in core storage 36. During this interval, previously recorded data is destroyed by blocking the output from the bit register sense latches 165.

The operation of the digit and word rings along with the function of the readin and readout at the inhibit and sense lines 42 and 43, respectively, is more fully described in the previously-mentioned Greenhalgh patent. The only explanation which appears necessary in this application is that normally readout and readin occur at the same digit time by timed pulses supplied to the digit, and bit drivers 50, 60, and 47, respectively, over the readout and readin lines 70 and 80, respectively, as indicated by the pulse superimposed on these lines. When the entire 60 words are placed in the core storage device 36, the calculator ring control and digit ring driver lines 151 and 53, respectively, are disconnected or dropped, and it is now possible to write this data on a selected track.

In order to connect the core storage 36 with the disc storage 37, the disc storage ring control line 166, FIG. 5*a*, is raised to condition a pair of diode switches 167 and 168, respectively. The line 166 is under the control of the operation register 29. As previously mentioned, the desired track is selected by placing the address in the distributor 34, FIGS. 1 and 2*a*, which in turn operates through the address relays, FIG. 2*b*, and servomechanism, FIGS. 3 and 4, to position the selected access arm 58 at the desired disc and track and at the same time operate the relays R147, R148, and R149, FIG. 2*b*, and contacts, FIG. 5*d*, to condition the upper or lower transducer 59 on the selected arm for operation.

Assuming the above track selection operation has taken place in response to a seek operation code 85 with the access arm resting at track 50 on disc face 01, and has been checked by a 2-out-of-5 validity check of the addresses in the relays 102 and distributor 34 and found correct, a write operation code 87 is placed in the operation register 29, FIGS. 1 and 5*c*. This code provides for reselecting the same track address, and if the same relays 102 are picked, an R/W output signal is provided from a diode switch analyzing circuit 169.

Referring to FIGS. 5*c* and 6*a* to 6*c*, which show in block outline the circuitry of location verifier and recycle controls 250, it will be seen that a first such R/W signal from circuit 169 switches at terminal 247 with an inverted output signal from a location verifier check control relay LCC and inverter 255 at a diode switch 251 through a diode mix 252 to turn on a location verifier check latch 254. The inverter 255 with the usual cathode followers CF provides an output signal when the location verifier check control relay LCC is not picked, thus indicating no previous location verifier check of the particular address.

Operation of the location verifier check latch 254 provides an output at terminal 257 which is applied to the write check latch 217, FIG. 5*c*, to initiate a check of the 4 location verifier digits on the track selected.

The head searches for the gap end and the pulse produced by the S bit, turns on the bit ring 184 through diode switch 220 and binary latch 227 to start oscillator A. The bit ring signal is applied to a location verifier gate latch 258 at terminal 260 through diode mix 253, and switches it to effect operation of an address switch 261 in the switch means 249 comprising a plurality of cathode followers CF to connect lines 256 of the address relay contacts **118*a* to compare circuit 79 through lines 45. A core switch 274 also of switch means 249, disconnects the core storage 36 from the compare circuit under the control of the location verifier gate latch 258**.

Location verifier gate on output from diode mix 259 switches at diode switch 262 with the ring (RB5) bit 0 output from terminal 263 through the usual inverters IN and cathode followers CF to advance a four digit location verifier ring 265 each digit. Diode switch 266, FIG. 5*a*, blocks advance of the digit ring 156 from the bit ring 184, while the location verifier gate 258 is on. The four location verifier digits are successively compared over lines 256 by compare circuit 79 with the address values stored in the contacts **118*a* of relays in columns 114–117. If a valid comparison results, the no error compare signal produced by inverter 267 at terminal 268, switches in diode switch 276 with the 355 no error signal from terminal 269 of validity check circuit 270 and the off signal from location verifier check latch 254 which is turned off by the inverted LD4 carry signal from the ring 265 through inverter 271 from the digit ring 265 at the end of reading the 4 location verifier digits, as is also the location verifier gate latch 258, to produce a start write signal which is applied through a cathode follower CF to the latch 171 at terminal 272**. If a previous location verifier check of the same address had been made, location verifier check control relay LCC would be picked, and a signal would be applied through armature *a* of LCC to diode switch 296 to mix at diode mix 297 and bypass the location verifier check latch 254.

The same signal is applied through a location verifier check control latch 275 to pick a location verifier check control relay LCC through armature *a* and normally open contacts of a position found relay PF, for preventing the location verifier check latch 254 from being turned on by an R/W signal until PF drops, indicating another seek operation at a different location.

Operation of latch 171, FIG. 5*c*, turns on write gap latch 172 to bias write amplifier 175 to act through erase coil 178 to remove previously recorded data. The write gap signal at terminal 264 mixes at diode mix 273 to prevent the bit ring drive signal at terminal 260 from turning the location verifier gate latch 258 on during the write gap operation. At the same time, write gate 179 is turned on causing oscillator A to operate and supply pulses to bit ring 184. A gap ring 188 is advanced one position for each cycle of digit ring 156, which is driven by bit ring 184 through diode mix 266 with the location verifier gate 258 off signal at terminal 277. At the end of its cycle ring 188 turns end of gap latch 187 on, and diode switch 194 operates at S time of ring 184 to generate a pulse before the first bit position of the location verifier digits is sampled to operate binary latch 199 and generate the start or S signal and record it.

Turning end of gap latch 187 off, turns write gap latch 172 off, the write gate 179, however, remains on. This turns on write record latch 202, which at terminal 279 applies a signal to turn the location verifier gate 258 on. This operates switch 261 to connect the address relay contacts 118*a* over lines 256 to the disc storage 37 for writing the location verifier digits following the S bit. As before, the RBO signal advances the location verifier digit ring 265 for writing the location verifier digits. The LD4 carry signal at the end of the cycle turns the location verifier check latch 254 and location verifier gate latch 258 off as before, and core switch 274 of switch means 249 is again operated to connect the core storage 36 to write the sixty words stored.

In order to translate the parallel by bit, serial by digit data in the core storage 36 to serial by bit and digit, an output line is provided from each of the 6, 3, 2, 1, and 0 bit stages in the bit ring 184, FIG. 5*a*, to the parallel-serial translator 205, FIG. 5*c*. These bit lines set up a series of latches or the like in a predetermined manner and as readout occurs from the first digit position in the core 36, FIG. 5*b*, to the bit register sense latches 165, these values are conducted over the 2-out-of-5 bit lines 45 in parallel to the parallel-serial translator 205, FIG. 5*c*. With each cycle of the bit ring 184, various combinations of the input lines 45 are sampled and the bit values leave the translator 205, within a digit time, serial by bit over the line 209 in the timed relationship shown in FIG. 15. The bit values are switched with clock pulses supplied over the line 195 at the diode switch 204 to drive over the line 52, FIG. 5*d*, and alternately operate the binary latch 199 to provide the alternate positive outputs leading to the input of the write amplifier 175. Alternate driving of the amplifier changes the current flow over the lines 176 and 177 to reverse the flux pattern at the transducers 59 as previously described and shown in FIG. 16.

The digit value read from core storage is returned within the same digit time. This is accomplished by presenting the same bit values delivered for translation over the connecting lines 46 leading to the core input and bit drivers 47. These values appear on the inhibit lines 42, FIG. 5*b*, for regeneration of the previously read information in the same digit position.

Recording of the values at each digit position occurs in an identical manner, digit by digit and by word until the beginning of word 59, digit 10, as shown in FIG. 16. As digit 10 of word 59 appears, positive values are directed over the respective digit and word lines 211 and 212 to a diode switch 213, FIG. 5*c*, and an S bit is generated by gating the S bit in the bit ring 184 over the line 196 with a clock pulse over the line 195. This bit signal operates the binary latch 199 at the space bit position and signifies that an end of record is approaching. Recording of the S bit in the track is primarily utilized to provide an even bit count along the track to return the flux pattern to the original condition.

As bit 0, digit 10, word 59 arrives, an output over the 0 bit line 214, FIG. 5*a*, is directed to an end of ring diode switch 215, which has been conditioned by the digit 10 and word 59, lines 211 and 212, respectively. This produces an end of ring signal extending over an end of ring line 216 and turns Off the write gate 179, FIG. 5*c*, to stop the oscillator A and clock 182. At the same time, the write record latch 202 is turned Off to drop the write record line 203, which drops the diode switch 204 at the output side of the parallel-serial translator 205 and the output from the binary latch 199, FIG. 5*d*. This completes the writing operation and includes the 60 words in the core storage device 36 which have been regenerated as described.

In the event that the compare unit 79 shows an error in comparison of the location verifier digits, a compare or no error signal is not available at terminal 268 of inverter 267, and consequently, the diode switch 276 output will be down, so that no output is available at terminal 272 to turn on latch 171.

The compare error signal over line 234 is applied through switch 280, which is turned on and off by the location verifier check latch on and off outputs, terminal 281, to mix with validity error signal from terminal 269*a* of check circuit 270 at diode mix 282, then through diode switch 283, cathode follower CF to the recycle single shot circuit 284, through diode mix 291, inverter amplifiers 1N and cathode followers CF to pick up the recycle relay RR. A hold circuit for RR is provided through armature *c* of relay RR and armature *b* of relays DN and TN. The output of the single shot turns on recycle latch 286 through diode mix 287.

The error signal from diode mix 282 also turns on diode switch 285, and inverter 288 through diode mix 298 to hold the LD4 carry signal from CF289 down and prevent advance of cores. LD4 carry signal mixes at diode mix 273 to turn the location verifier gate latch 258 off. Inverter 271 turns location verifier check latch 254 off by plate pull over. A diode switch 290, switched by the RBO signal and the LD4 carry control signal from CF289, gives a pulse at terminal 298 through an inverter 1N and cathode follower CF to synchronize digit ring 156 through diode mix 299.

RR reconnects address relays in tree 112 at armatures *a*, *b*, etc., FIG. 4, and changes the ground position on resistor 129 to set up fictitious address ten positions removed and sets up a hold circuit through armature *c* and normally open contacts of RR, and armature *b* and normally closed contact of disc and track null relays DN, TN. The disc null relay DN drops, and this drops the track null relay TN through armature *a* and normally open contacts of DN, the track detent switch 146*a* opens and position found relay PF is dropped.

The arm 58 is moved out and to the fictitious address. Relay DN picks and then TN, and the track detent switch 146*a* closes, RR drops when DN and TN pick, opening armatures *b* and normally closed contacts. The servo-amplifier 138 now drives the arm 58 to the address in the address relays as before, since the original address circuit is restored by RR dropping. When DN and TN pick and disc detent switch 146*a* closes, PF picks and turns off the recycle latch 286 through inverter 292 and cathode follower CF. Output from 286 starts end recycle delay 294 which turns on location verifier check latch 254 over line 295 with the inverted no location verifier check control signal from LCC armature *a* and inverter 255 to commence a location verifier check as described.

In order to insure that the data in the core storage 36, FIG. 5*b*, corresponds to that written on the track by the read/write heads 59, FIG. 5*d*, a write check operation is automatically initiated. As the write record latch 202, FIG. 5*c*, turns Off, a write check latch 217 is energized to raise its output line 218. During this interval, it is necessary to defer or prevent readout of the core storage 36, until such time as the end of gap record or generated S bit on the selected track appears under the associated transducer 59. Detection of the first bit causes a current flow over the lines 176 and 177, FIG. 5*d*, which extends to a read amplifier 219. The output from the amplifier is impressed over the read bus lines 72′ and 72 to permit synchronization of the system.

As the S bit passes over the read bus line 72′ and 72, to the diode switch 220 which was conditioned by the write record line 218, FIG. 5*c*, an output is directed over a line 221 and operates a binary latch 222, FIG. 5*c*, to start the oscillator A, which in turn operates the clock 182 in the described manner to provide continuous clock pulses over the lines 69 and 195. At the same time, this first pulse on the line 221 turns On a read latch 223, FIG. 5a, to cause a read diode switch 224 to provide an output. This diode switch had previously been conditioned by the S bit line 196 extending from the bit ring 184 and the write check latch line 218. The output from this switch extends over a conductor 225 to a latch 226 to turn the same On, which in turn drives over a conductor 227 through a diode mix and the conductor 186 to condition the diode switch 167 associated with the output of digit ring 156 over line 158. Conditioning of this latter switch bypasses the gap ring 188, which was utilized to provide the gap prior to the actual write operation.

With clock operation initiated by the S bit appearing on the read bus line 72, the bit ring drive is started and the clock pulses are directed to a read diode switch 228, FIG. 5c, which is also connected to the bus line 72.

Bit drive signal on at terminal 260 turns on location verifier gate latch 258 to operate switch 261 to connect location verifier address relay contacts 118a for comparing with address read from track. If an error shows, compare unit 79 error signal is applied over line 234 and switch 280 to latch 171 to commence rewrite. Location verifier digit ring 265 is advanced as hereinbefore by RBO signal from digit ring 184 and at the end of location verifier digits LD4 carry signal turns location verifier gate 258 off to operate core switch 274 to connect storage 36 for comparing.

From this point, the serial arrival of the bits on the lines 72′ and 72 are switched with the clock pulses and are directed over a line 229 to suitable switching 230, FIG. 5a, leading to the serial-parallel translator 73. This translator comprises suitable groups of latches or the like which serially accept the coded bit values delivered at each bit interval and store the same to provide a parallel positive pulse readout over bit lines 232 leading to individual inverters 231 whose individual outputs are connected to the comparing units 79, FIG. 5c. The inverters 231 are included to provide positive values on their related bit lines 207 in the absence of a positive pulse on the bit lines 232.

During the reading of the first digit from the track, the first digit position, bearing the same data, is read from core memory 36 over the line 45 and presented to the comparing mechanism or unit 79. This comparing mechanism is shown diagrammatically and may include a plurality of diode switches or the like 208, only one of which is shown, for each pair of bit lines connected to parallel inputs so that similar bit lines are simultaneously sampled to determine if they are in like conditions for each digit position. If each bit line for that particular digit value agrees, the inverters 231 provide selective positive and negative values on the related output lines 207, which are opposite to the values delivered over the line 45 to the diode switch 208. Therefore, an output line 210 from each switch 208 remains down. This indicates that a true or correct writing operation had taken place. If in error, the bit values delivered to the related inverters 231 drive the related output lines negative while the remaining lines stay positive. These positive values switch with certain of the positive values arriving over the lines 45 at one of the diode switches 208 and a signal is provided over the line 210 to operate a bit comparing error latch 246. As each digit position is serially presented for comparison, the data read from that particular digit in core memory 36 is returned during the regeneration interval for storage and the information in the serial-parallel translator is destroyed by a reset operation or pulse supplied over a reset line 183.

At the end of a complete check, that is, digit 10, word 59, and end of ring signal is presented from the diode switch 215, FIG. 5a, over the line 216 to turn the read latch 223 Off and to the write check latch 217, FIG. 5c, to turn the same Off. The writing and checking operations have now been completed, and the data is available for any future use.

Should an error be indicated between the recorded data on the track and similar digit positions in the core storage 36, a signal from the comparing unit 79, FIG. 5c, is delivered from the bit compare latches 246 over a non-compare line 234 through switch 280 to again turn On the write mode latch 171. This operation immediately initiates a second complete writing operation identical to that previously described. Under these conditions, random writing is initiated, and all of the previous data is re-recorded; however, the circumferential location may vary.

A read operation is somewhat similar to a write check operation in that the write amplifiers 175, FIG. 5d, are prevented from effecting any change in flux pattern. With a read operation code 86 in the operation register 29, FIG. 5c, reading of the S bit renders the location verifier and recycle control 250 effective as in a write operation to first read and compare the location verifier address digits as hereinbefore described. After a valid compare is effected, a read mode is initiated by operation of one or more read latches 236, which provide an output over a line 237 to a diode switch 238. The output from this switch extends over the line 221 to operate the binary latch 222 and the latch 223, FIG. 5a, to initiate the reading of data from the track. During a read operation, all data delivered to the read amplifier 219, FIG. 5d, appear on the read bus line 72′ and is presented to the serial-parallel translator 73, FIG. 5a, serial by bit, as mentioned for write check. The only exception between the write check and read operation is that no comparison is made in the comparing unit 79 at this time, and that the serial-parallel translator 73 provides an output which is presented to the bit drivers 47, FIG. 5b, for storage in core memory parallel by digit, after the bits in each digit are accumulated in the translator 73. The line 237 extending from the read latches may be directed to the serial-parallel translator 73 to effect the parallel readout to the bit drivers 47.

Referring now to FIG. 20 for a brief description of the timing utilized during a read and write check, there is shown the timing relation of the various bit signals appearing in several of the digit positions and the beginning of a record. The first pulse 240 appearing over the bus line 72 is located in the space bit position of the first digit. The leading edge of the first or S bit is effective to operate the A side of the binary latch 222, FIG. 5c, as shown at 241, which provides an output to start the oscillator A whose output in turn directs a wave shape 242, FIG. 20, to the clock 182. Operation of the clock generates shaped pulses 245 for delivery to the system and is utilized in the switching for the delivered bit pulses and to drive the bit, digit, and word rings in synchronism therewith. The leading edge of the next bit 244 again operates the binary latch to raise the B side, not shown, and drop the A which cuts off the oscillator A. However, before the clock 182 stops, the B side of the binary latch initiates operation of the oscillator B to provide a wave shape 245. This output is directed to the clock to keep the same running at the proper rate. The leading edge of each bit thus acts to alternately drive the clock for the A and B oscillators. In this manner, the clock remains in phase with the delivered bits. Since the particular type of timing means forms no part of the invention, the above description is all that is deemed necessary. However, an oscillator of the type described for use in this system is shown in L. Seader application, Serial No. 537,260, filed September 28, 1955, now Patent No. 2,864,078, issued December 9, 1958, and assigned to the assignee of the present invention.

It is to be understood that various additional timing pulses, switching, and the like not shown would be required to transfer the data to and from the core storage. However, these additional elements, if shown, would merely tend to complicate both the description and drawings without aiding in the understanding of the invention. Therefore, for the sake of simplification, all elements not bearing directly to the data transfer system have been eliminated.

From the above, it can be seen that a random access, magnetic disc storage system has been provided, wherein the recording of data may be accomplished on a circular track in a random manner along the circumference without regard to any particular home position and that this random recording will occur each time data is recorded on the track and will vary from track to track, disc to disc, or unit to unit. The first read/write instruction following a seek command renders effective track address verifying means, and following a verification, a subsequent read/write command at the same address bypasses the verifying means if the head is still at the same address. Any error in arm or head location automatically causes recycling of the servodrive to reseek the correct address, whether the error is caused by misdirecting the head improper operation of the track or disc detents, transient signal errors caused by runout of the disc, worn magnetic coating or weak data signal recording. Also, any read or read-check cycle is solely dependent upon the sensing of an end of gap bit which initiates operation of clock pulses by means of the binary latch and associated oscillators. With reading and recording taking place at any circumferential point along the circular track, the requirement of precise timing with some position on the disc has been eliminated and delays because of arm location errors are minimized. In this manner, the various units may be operating at various speeds within predetermined limits, without effecting the transfer of data between the storage and random access unit. With increased recording speeds applied to a data processing system requiring a large number of data transfers to and from a large random access storage unit, a considerable saving in processing is realized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a storage medium having a plurality of data storing tracks each with individual address data thereon, recording means movable to different ones of the tracks, means for effecting relative movement of the medium and recording means in a direction along the tracks, means for effecting relative movement of the recording means and medium transversely of the tracks to locate the recording means at a particular one of the different tracks in response to particular address information, means for comparing the address data of a selected track with said address information, means operated by an error signal from said comparing means to effect operation of the transverse moving means to locate the recording means at a different track, and means responsive to location of the recording means at said different track to redirect the recording means to said particular one track in accordance with the particular address information.

2. In a device for storing data in a plurality of digit positions to provide coded character representations, a storage medium having one or more data storing tracks with specific track address indicia for each track, recording means, means operable to locate the recording means at different ones of said tracks, address storing means selectively operable to effect operation of the recording means locating means to locate the recording means at a particular track in accordance with stored address information, comparing means for comparing the stored address information with the address of the track at which the recording means is located, recycling means operated by an error from the comparing means and cooperative with the address storage means to set up an artificial address in the address storage means for directing the recording means to the track designated by the artificial address, and means responsive to location of the recording head at the track designated by the artificial address, to render the recycling means inoperative and restore the original address information for redirecting the recording means to reseek the track of the original address information.

3. In a device for storing data in a plurality of digit positions, a storage medium having one or more data storing tracks with individual indicia thereon, erasing and recording means, means for moving the erasing and recording means to different ones of said tracks, means for selectively effecting operation of the erasing and recording means to erase and record on said tracks, means for selecting a particular one of said tracks for a recording operation including storage means for an address of a track to be selected, comparing means for comparing the selected track indicia with the address in the storage means, recycling means operated by an error in comparing to effectively change the address stored and effect operation of the erasing and recording means to a new track removed a predetermined number of tracks from the one originally designated by the stored address, and means responsive to selection of the new track to render the recycling means inoperative and effect operation of the moving means to reselect the track designated by the original address stored.

4. In a device for storing data in a plurality of digit positions to provide coded character representations, a magnetic storage medium having a plurality of data storing tracks each with an individual address digit indicia, erasing and recording means movable to different ones of the tracks, means providing relative movement between said erasing and recording means and said storage medium along a one of said tracks, servo means including means for selectively effecting operation of the servo means to move the erasing and recording means to a particular track including track address information storage means, comprising means ofr comparing the stored address information and the address indicia of the particular track, recycling means responsive to an error in such comparison to effectively change the stored address information and effect operation of the servo means to move the erasing and recording means to another track, and means responsive to location of the erasing and recording means at said another track to render the recycling means ineffective and cause the servo means to reselect the particular track of the original stored address information.

5. In a device for storing data in digit positions to provide coded character representations, a data storage medium having a plurality of data storing tracks each with individual track indicia digits for storing a plurality of data position in each track and wherein a space is provided between the last and first digit positions, a transducer associated with said storage medium, servo means effecting relative movement between the transducer and storage medium to locate the transducer at different ones of the tracks, means for storing track address information to selectively effect operation of the servo means to locate the transducer at a particular track, comparing means, means connecting the transducer and address storage means to the comparing means for comparing the track address indicia and the stored track address information, recycle means operated by a compare error to modify the stored track information and locate the transducer at a different track, and means responsive to location of the transducer at said different track to render the recycle means ineffective and redirect the transducer to the track of the original address information.

6. In a device for storing data in a plurality of digit positions, a rotatable storage medium having one or more data storing tracks for storing a plurality of digits in each track and each track having individual track address digits stored at the beginning of the track, buffer storage means for temporarily storing data to be recorded, a transducer movable from one track to another, servo means operable to move the transducer, track address data storage means selectively operable to effect operation of the servo means to locate the transducer at a particular track, comparing means, means responsive to a read/write instruction for selectively connecting the comparing means to the transducer and the track address storage means to read and compare the track address digits with the stored track address, means responsive to a compare error to modify the address in the storage means and direct the transducer to a track removed a predetermined number of positions from the original location, means responsive to location of the transducer at said removed track to redirect the transducer to the track of the stored address, buffer storage means, means responsive to a correct comparison for erasing to provide a gap of predetermined length, and means responsive to termination of the gap to effect connection of the transducer to first record the address digits and then the data from said buffer storage means.

7. In a device for storing data in digit positions to provide coded character representations, a rotatable magnetic storage medium having a plurality of tracks for storing a plurality of digits in each track and each track initially having individual track address digits recorded at the beginning of each track, means for selectively shifting said transducer to different ones of the tracks, buffer storage means for temporarily storing data to be recorded, address storage means for storing track address information and effecting selective operation of the shifting means to shift the transducer to a selected track designated by the stored address information, comparing means, means responsive to initiation of a recording operation to connect the comparing means, transducer and address storage means for comparing the address digits of the selected track and the stored address, recycling means activated by a compare error to effectively change the address information and direct the transducer to a predetermined track removed from the desired one, means responsive to location of the transducer at the removed track to deactivate the recycling means and redirect the transducer to the track designated by the stored address, means responsive to location of the transducer at the designated track to again compare the address digits and the stored address, and means activated by a valid comparison to erase a gap of predetermined length and selectively connect the transducer address storage means and buffer storage means to rewrite the address digits and write the stored data.

8. In a device for storing data in digit positions, a rotatable magnetic storage medium having a plurality of spaced tracks for storing a plurality of data bearing digits thereon with a blank space followed by a plurality of track address digits individual to each track at the start of each track, a transducer movable to record digits on different ones of said tracks, an intermediate storage unit for temporarily storing a group of words for delivery to one of said tracks, servo means for shifting the transducer to different ones of the tracks, means including address storage means for effecting operation of the servo means to direct the transducer to a desired track, and location verifier and recycling means for comparing the address digits on the selected track with the address in the storage means and in response to a compare error first directing the transducer to a new address and then back to reseek the desired track before commencing to record the data in the intermediate storage means.

9. In a device for storing data in digit positions to provide coded character representations, a rotatable storage medium having a plurality of spaced data storing tracks, each track being disposed for recording thereon a plurality of digit bearing bits and having a gap followed by a predetermined number of track address digit bits at the beginning thereof, transducer movably associated with said medium for reading, erasing, or recording on any of said tracks, servo means for moving the transducer to different ones of said tracks, address storage means for effecting operation of the servo means to move the transducer to a track designated by an address in said storage means, comparing means, location verifier means operable to connect the comparing means, address storage means and transducer to compare the track address digits of the track actually selected with the stored track address, recycle means activated by a compare error to effectively change the stored track address to one removed a predetermined number from the designated address, position found means for rendering the recycle means ineffective and restoring the original stored track address for effecting operation of the servo means to reseek the original address in the storage means, intermediate storage means for data to be recorded, and means responsive to a valid compare for erasing a predetermined gap, rewriting the address digits and then writing the data.

10. In a magnetic memory device for storing words of data each of which includes a plurality of digit positions recorded to provide coded character representations, a plurality of rotatable discs having magnetizable surfaces to provide a plurality of spaced circular data storing tracks for storing digit bearing bits thereon and having initially recorded thereon track and disc address digits of a nature individual to each track and disc, said digits being at the beginning of each track and adapted to be preceded by a gap and an end of gap signal bit, a transducer for selectively reading, erasing and writing on any track, servo means for moving said transducer to any one of said tracks, a register for storing the address of a track and disc to be selected and effecting operation of the servo means to move the transducer to the selected track and disc, means responsive to location of the transducer at a track and disc in response to a stored address to compare the track and disc address digits and the address stored, recycle means for effectively changing the disc portion of the stored address to effect operation of the transducer to an artificial address being the corresponding track on a disc a predetermined number of discs away, means responsive to location of the transducer at the track designated by the artificial address for rendering the recycling means ineffective and restoring the original stored address so as to effect operation of the servo means to redirect the transducer to the stored address, means responsive to a valid comparison of the track and stored address to effect operation of the transducer to erase a predetermined gap, intermediate storage means for data to be recorded, and gap end means operable to effect connection of the address storage means and the transducer to rewrite the track and disc address digits of the selected track before recording data.

References Cited in the file of this patent

Publication: "IBM Reference Manual," RAMAC 305 (International Business Machines Corp., copyright 1958).